(12) United States Patent
Singh et al.

(10) Patent No.: US 11,975,713 B2
(45) Date of Patent: *May 7, 2024

(54) SELF-CONTAINED INTELLIGENT BRAKING SUBSYSTEM

(71) Applicant: CNH Industrial America LLC, New Holland, PA (US)

(72) Inventors: Aditya Singh, Bolingbrook, IL (US); Ryan Jenkins, Bolingbrook, IL (US); Joshua Guarino, Plainfield, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/077,879

(22) Filed: Dec. 8, 2022

(65) Prior Publication Data
US 2023/0104377 A1    Apr. 6, 2023

Related U.S. Application Data

(63) Continuation of application No. 17/124,391, filed on Dec. 16, 2020, now Pat. No. 11,572,066.

(51) Int. Cl.
*B60T 7/12* (2006.01)
*B60T 8/34* (2006.01)
(Continued)

(52) U.S. Cl.
CPC ............. *B60W 30/143* (2013.01); *B60T 7/12* (2013.01); *B60T 8/34* (2013.01); *B60T 13/686* (2013.01);
(Continued)

(58) Field of Classification Search
CPC .... B60W 10/04; B60W 10/119; B60W 10/18; B60W 10/184; B60W 10/196;
(Continued)

(56) References Cited

U.S. PATENT DOCUMENTS 5,573,312 A    11/1996   Muller et al.
6,059,383 A    5/2000    Paggi et al.
(Continued)

FOREIGN PATENT DOCUMENTS

CN    106043263 A    10/2016
WO    WO-2011/075014    6/2011

OTHER PUBLICATIONS

Kopier, Michelle; "Smart Stops"; OEM Off-Highway; Nov. 12, 2014; https://www.oemoffhighway.com/drivetrains/brake-system/article/12016087/intelligent-braking-systems.
Lei, Yulong et al., "Application of Fuzzy Logic in Constant Speed Control of Hydraulic Retarder," Advances in Mechanical Engineering, vol. 9(2) 1-11, Feb. 1, 2017, 11 pages.

*Primary Examiner* — Edwin A Young
(74) *Attorney, Agent, or Firm* — Rickard K. DeMille; Rebecca L. Henkel; Peter K. Zacharias

(57) ABSTRACT

A control system includes one or more processing circuits comprising one or more memory devices coupled to one or more processors. The one or more memory devices are configured to store instructions thereon that, when executed by the one or more processors, cause the one or more processors to acquire speed data regarding current speeds of tractive elements of the vehicle from tractive element speed sensors of the vehicle, determine speed references for the tractive elements to perform autonomous driving operations where the speed references indicate speeds at which each of the tractive elements should rotate to accommodate the autonomous driving operations, and control at least one of a driveline or a brake system of the vehicle to selectively alter the current speeds of the tractive elements of the vehicle based on the current speeds and the speed references to accommodate the autonomous driving operations.

20 Claims, 9 Drawing Sheets

(51) Int. Cl.
*B60T 13/68* (2006.01)
*B60T 15/02* (2006.01)
*B60W 10/04* (2006.01)
*B60W 10/119* (2012.01)
*B60W 10/184* (2012.01)
*B60W 10/196* (2012.01)
*B60W 30/14* (2006.01)
*B62D 53/00* (2006.01)

(52) U.S. Cl.
CPC ........... *B60T 15/028* (2013.01); *B60W 10/04* (2013.01); *B60W 10/119* (2013.01); *B60W 10/184* (2013.01); *B60W 10/196* (2013.01); *B62D 53/00* (2013.01); *B60T 2240/00* (2013.01); *B60T 2270/82* (2013.01); *B60W 2300/152* (2013.01); *B60W 2300/185* (2013.01); *B60W 2520/00* (2013.01); *B60W 2520/28* (2013.01); *B60W 2555/00* (2020.02); *B60W 2710/09* (2013.01); *B60W 2710/18* (2013.01); *B60W 2720/28* (2013.01)

(58) Field of Classification Search
CPC ....... B60W 2555/00; B60W 2300/152; B60W 2300/185; B60W 2520/00; B60W 2520/28; B60W 2710/09; B60W 2710/18; B60W 2720/28; B60T 7/12; B60T 8/34; B60T 13/686; B60T 15/028; B60T 2240/00; B60T 2270/82; B62D 53/00
See application file for complete search history.

(56) References Cited

U.S. PATENT DOCUMENTS

| | | | |
|---|---|---|---|
| 6,536,408 | B1 | 3/2003 | Warner |
| 6,728,621 | B1 | 4/2004 | Walenty et al. |
| 6,819,995 | B2 | 11/2004 | Bellinger |
| 7,593,801 | B2 | 9/2009 | Lock et al. |
| 7,841,674 | B2 | 11/2010 | Goebels et al. |
| 8,016,367 | B2 | 9/2011 | Hirata |
| 8,167,383 | B2 | 5/2012 | Nishino et al. |
| 8,214,113 | B2 | 7/2012 | O'Neil et al. |
| 8,287,055 | B2 | 10/2012 | Lee |
| 8,616,659 | B2 | 12/2013 | Nordhoff |
| 8,935,068 | B2 | 1/2015 | Kresse et al. |
| 9,315,179 | B2 | 4/2016 | Herges et al. |
| 9,381,904 | B2 | 7/2016 | Andrasko et al. |
| 10,112,586 | B2 | 10/2018 | Brooks et al. |
| 10,207,689 | B2 | 2/2019 | Mueller et al. |
| 10,569,775 | B2 | 2/2020 | Karlsson et al. |
| 2012/0209481 | A1 | 8/2012 | Rindfleisch et al. |
| 2013/0197773 | A1 | 8/2013 | Shuler et al. |
| 2018/0257649 | A1 | 9/2018 | Simmons et al. |
| 2018/0281599 | A1* | 10/2018 | Kentley-Klay ........ B60W 10/20 |
| 2019/0118817 | A1* | 4/2019 | Crepin ............... B62D 15/0285 |
| 2019/0226579 | A1 | 7/2019 | Zhang et al. |
| 2019/0280674 | A1* | 9/2019 | Berkemeier ....... H03H 17/0257 |
| 2019/0375411 | A1 | 12/2019 | Oberg et al. |
| 2019/0389438 | A1* | 12/2019 | Lin ..................... B60T 17/088 |
| 2020/0079344 | A1 | 3/2020 | Oberg et al. |

* cited by examiner

SELF-CONTAINED INTELLIGENT BRAKING SUBSYSTEM

CROSS-REFERENCE TO RELATED PATENT APPLICATIONS

This application is a continuation of U.S. patent application Ser. No. 17/124,391, filed Dec. 16, 2020, which is incorporated herein by reference in its entirety.

BACKGROUND

Braking systems on wheeled agricultural and construction machinery include a hydraulic master cylinder and/or hydraulic power brake valve that mechanically connects to a foot pedal in the cab. While these components may have position switches, they do not have other electronic functions. Traditional valves and cylinders generally cannot be actuated by an on-board controller. Driver assistance and autonomous operations using traditional components have been limited.

SUMMARY

One embodiment relates to a control system for a vehicle. The control system includes one or more processing circuits comprising one or more memory devices coupled to one or more processors. The one or more memory devices are configured to store instructions thereon that, when executed by the one or more processors, cause the one or more processors to acquire speed data regarding current speeds of tractive elements of the vehicle from tractive element speed sensors of the vehicle, determine speed references for the tractive elements to perform autonomous driving operations where the speed references indicate speeds at which each of the tractive elements should rotate to accommodate the autonomous driving operations, and control at least one of a driveline or a brake system of the vehicle to selectively alter the current speeds of the tractive elements of the vehicle based on the current speeds and the speed references to accommodate the autonomous driving operations.

Another embodiment relates to a control system for a vehicle. The control system includes one or more processing circuits. The one or more processing circuits are configured to acquire speed data regarding current speeds of tractive elements of the vehicle, determine speed references for the tractive elements to perform autonomous driving operations where the speed references indicate speeds at which each of the tractive elements should rotate to accommodate the autonomous driving operation, control at least one of a driveline or a brake system of the vehicle to selectively alter the current speeds of the tractive elements of the vehicle based on the current speeds and the speed references to accommodate the autonomous driving operations, detect a loss of traction event for a respective tractive element of the tractive elements in response to a current speed of the respective tractive element increasing at a rate greater than a threshold rate, and, in response to the loss of traction event, engage a respective brake of the brake system associated with a tractive element positioned opposite the respective tractive element experiencing the loss of traction event.

Still another embodiment relates to a control system for a vehicle. The control system includes one or more processing circuits. The one or more processing circuits are configured to monitor (i) a speed of a first tractive element positioned on a first side of the vehicle and (ii) a speed of a second tractive element positioned on an opposing side of the vehicle, detect a loss of traction event for the first tractive element in response to the speed of the first tractive element increasing at a rate greater than a threshold rate, and engage a brake associated with the second tractive element to slow the opposing second side of the vehicle similar to the first side of the vehicle as a result of the loss of traction event.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
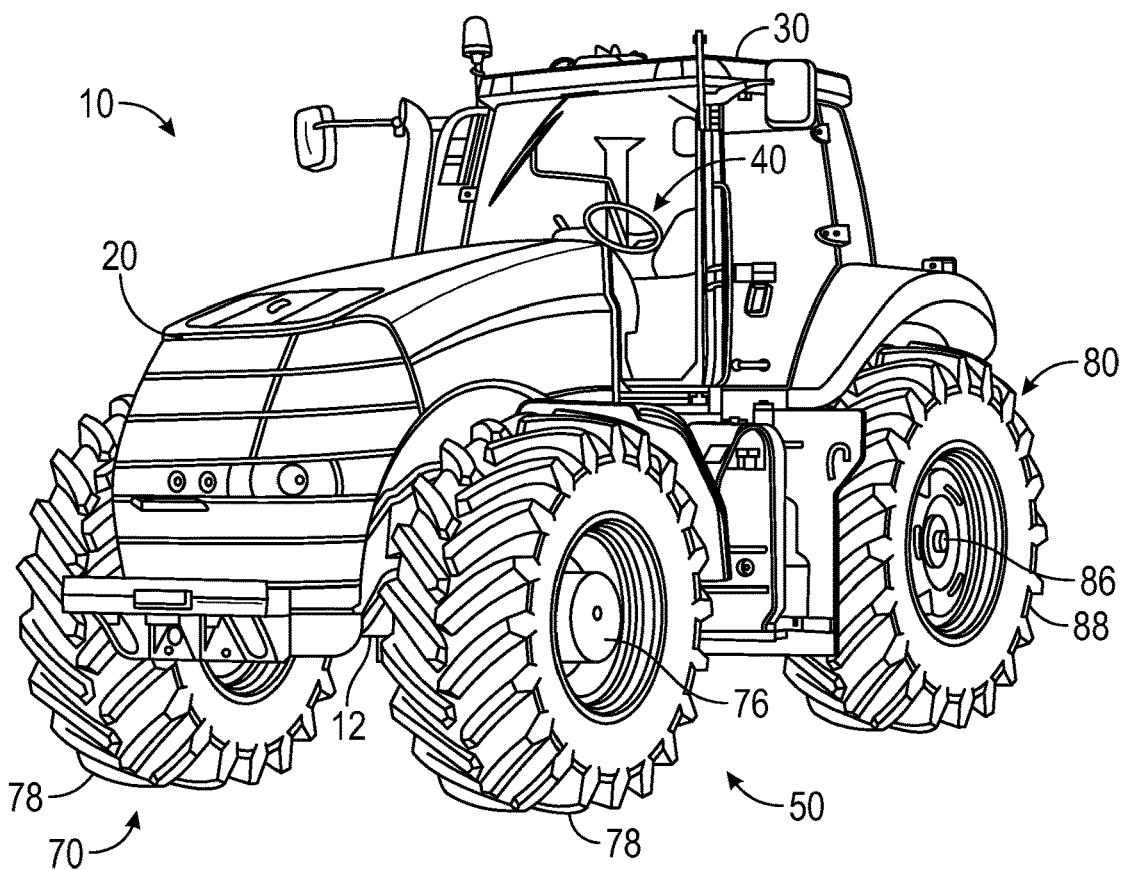
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a driveline, a braking system, and a control system. The driveline includes a prime mover (e.g., an engine, a motor, etc.), a transmission, a front tractive assembly, and a rear tractive assembly. Each of the front tractive assembly and the rear tractive assembly includes an axle and tractive elements (e.g., wheels, tracks, motive, etc.). The prime mover and/or the transmission facilitate selectively providing driveline power or driveline brake power to the front tractive assembly and/or the rear tractive assembly. The braking system includes a braking subsystem (e.g., a self-contained braking module, etc.) and one or more brakes positioned to selectively provide brake power to the axle and/or the tractive elements of the front tractive assembly and/or the rear tractive assembly. The braking subsystem includes a brake controller, at least one electronically-controllable actuator (e.g., an electrohydraulic actuator, an electropneumatic actuator, etc.), and at least one electronically-controllable valve fluidly coupled to the electronically-controllable actuator and the one or more brakes. The control system is configured to store vehicle information (e.g., regarding vehicle dynamics, vehicle functional capabilities, etc.), acquire environment data regarding an environment proximate the vehicle, determine and/or receive driving instructions for the vehicle based on the environment data, and determine speed references for the tractive elements based on the driving instructions and the pre-stored vehicle information. The brake controller and the control system are both configured to (i) acquire speed data regarding a current speed of each of the tractive elements and (ii) control the driveline and/or the braking system based on the current speed of each of the tractive elements and the speed references. According to an exemplary embodiment, the braking subsystem facilitates both manual operator control and autonomous control of the vehicle. Vehicle specific operations, such as brake assisted steering, traction control, and anti-lock braking ("ABS"), may also be provided by the braking subsystem. According to an exemplary embodiment, the closed-loop speed control performed by the braking subsystem allows the braking subsystem to be agnostic to tire inflation, tire size, number of tires, number of axles, ground conditions, vehicle inclination, vehicle mass/inertia, vehicle weight distribution, etc. All of these effects and varying conditions are captured in the speed data and are, therefore, accounted for without having to directly monitor and account for them individually. Although, these effects and conditions may be modeled or accounted for in the upper levels of the controller architecture responsible for determining the speed references.

According to another exemplary embodiment, the vehicle includes a braking system in coordination with a driveline to inhibit overspeed conditions in both the vehicle speed and the engine speed. For example, when a vehicle such as a tractor is set to operate at a desired or target speed, either by an operator or an autonomous controller, there is a limited amount of engine braking available to slow the vehicle in an overrun condition. Because of this, a method to control service braking is desirable to allow the vehicle to maintain the target speed. This control system coordinates the engine and service braking to maintain the vehicle speed and prevent the transmission or other driveline components from driving through the service brakes. Existing vehicles do not implement electronic service braking. Rather, typical vehicle systems rely on a human operator. For example, if engine overspeed is occurring, the operator is notified via a lamp in a vehicle cabin. It is then up to the operator to apply the service brakes manually. The human operator may apply the service brakes incorrectly or in a manner that leads to other problems. The integration of an electronic braking system would greatly improve the functionality of such systems over the currently available braking solutions. The electronic braking system allows the service brake to be applied electronically in a timely and efficient manner. In some embodiments, a commanded engine speed and a commanded vehicle speed are subtracted from their respective measured speeds. If both outputs are zero or negative, no overspeed conditions exist. On the other hand, if either of the measured speeds are greater than their respective command speeds, an overspeed condition is occurring. The control scheme includes tuned outputs allowing the degree of overspeed by either the engine or the vehicle to be given priority (e.g., by a weighting function or a weighted average). In some embodiments, secondary inputs can impact the tuning (e.g., a load on the vehicle, a slope or downgrade, a GPS location system, a look ahead system, etc.). The tuned outputs are provided as an input to a controller such as a PID controller. The PID controller calculates and applies a correctional pressure to the service brakes based on the input and the constants chosen by the tuning. In some embodiments, the service brakes are given priority over engine braking. The service brakes are then applied to reduce and inhibit overspeed conditions in coordination with the engine braking.

Overall Vehicle

Figure 2:
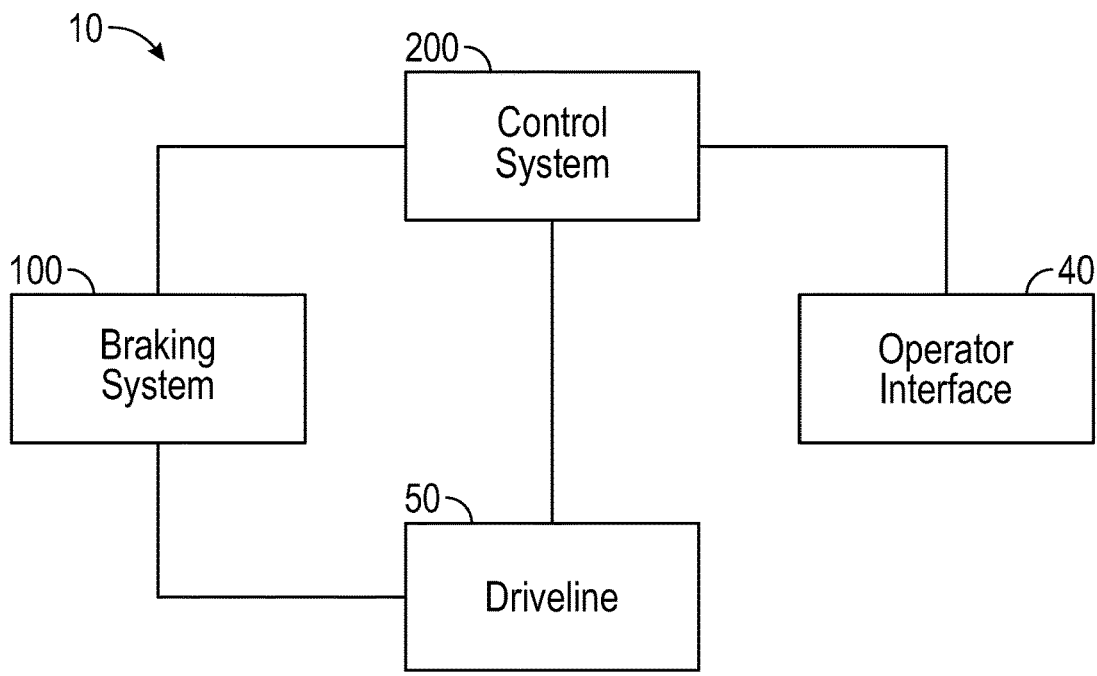
FIG. 2 is a schematic block diagram of the vehicle of FIG. 1, according to an exemplary embodiment.
Figure 3:
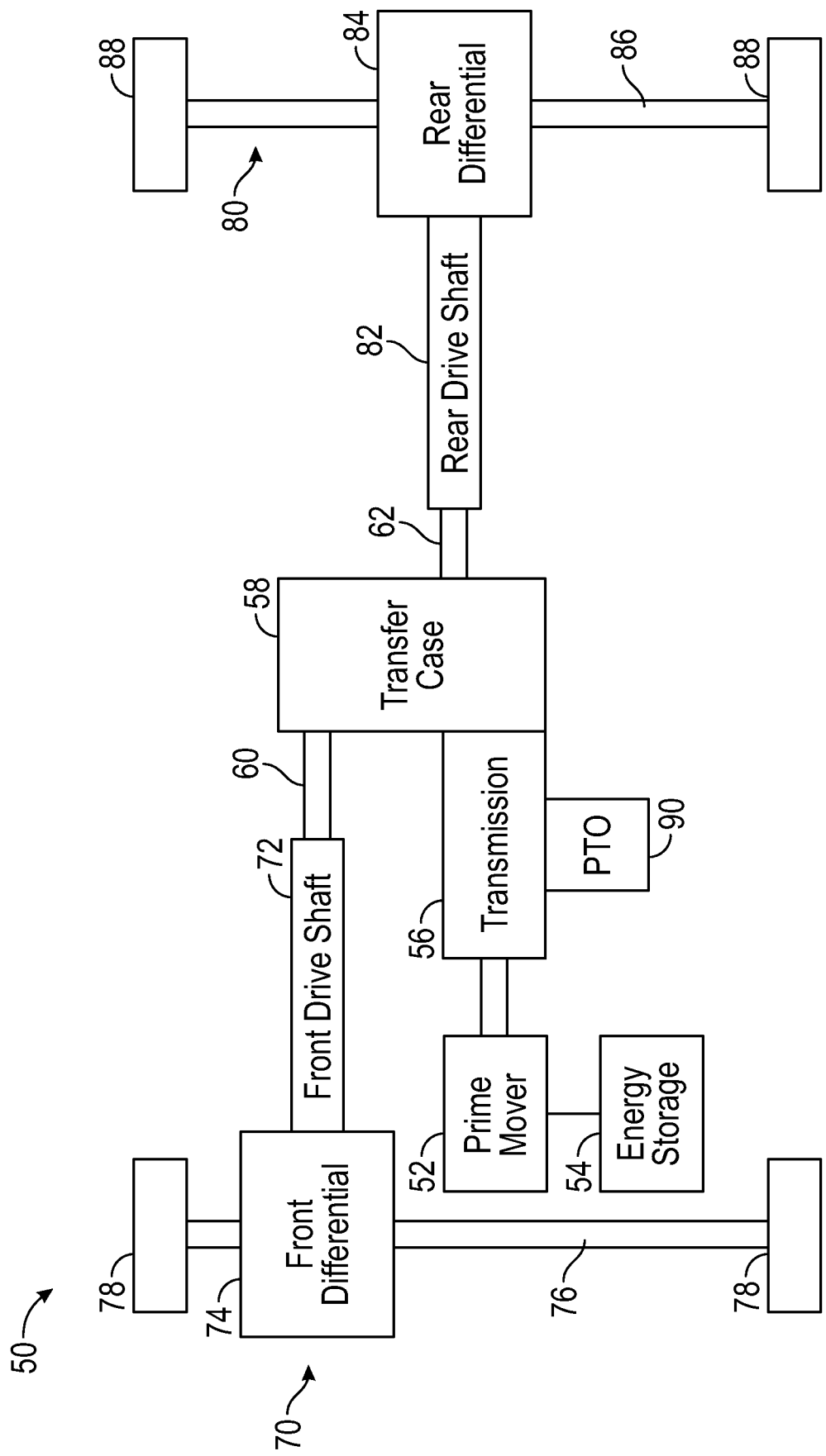
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement (see, e.g., trailed implement 300 in FIG.

4) of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

Braking System

Figure 5:
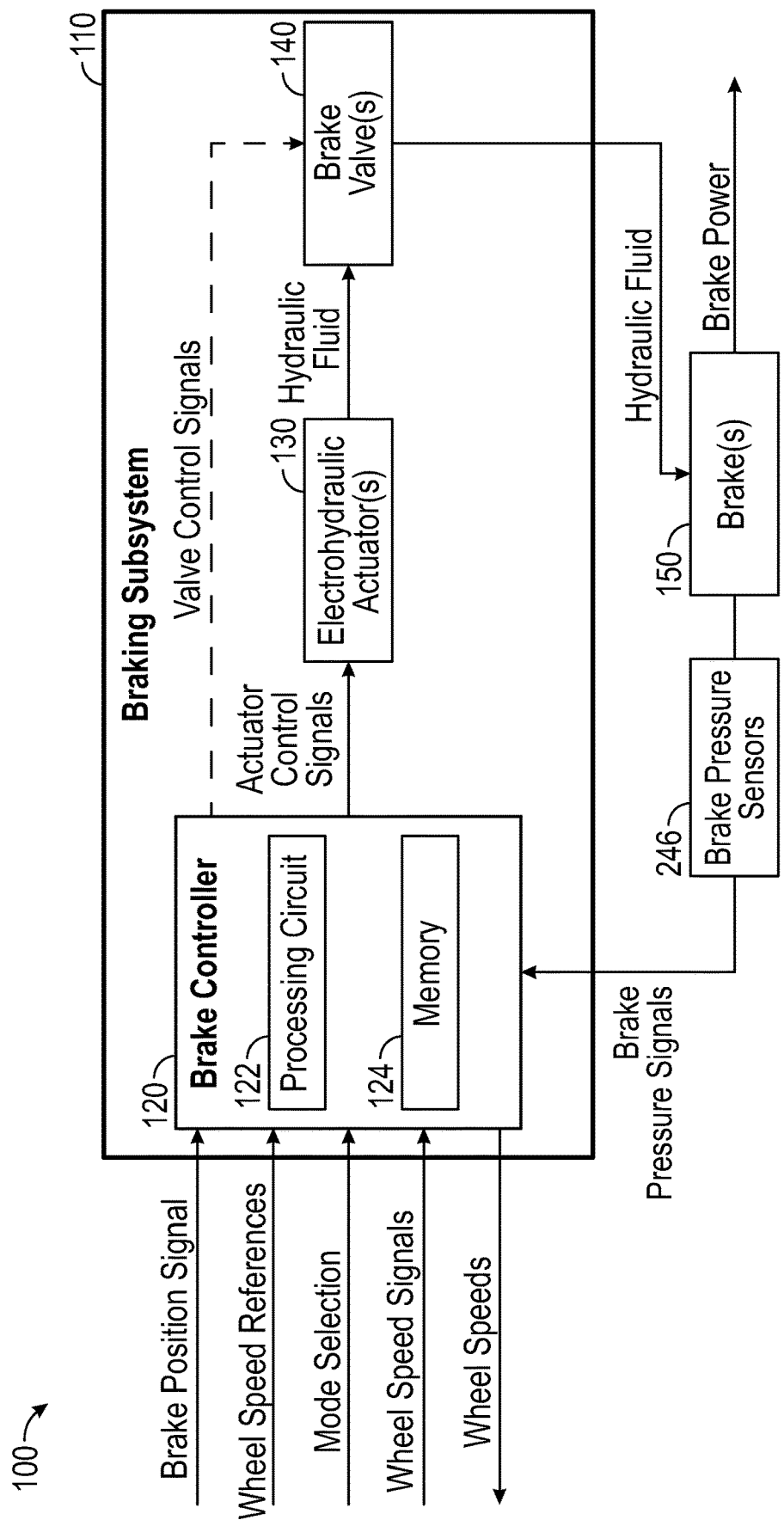
FIG. 5 is a schematic block diagram of a braking system of the vehicle of FIG. 1, according to an exemplary embodiment.

As shown in FIG. 5, the braking system 100 includes (i) a braking module, shown as braking subsystem 110, and (ii) one or more brakes (e.g., disc brakes, drum brakes, in-board brakes, axle brakes, service brakes, etc.), shown as brakes 150. The braking subsystem 110 includes a first controller, shown as brake controller 120; at least one electronically-controllable actuator, shown as electrohydraulic actuator 130, communicatively coupled to the brake controller 120; and one or more brake valves, shown as brake valves 140, fluidly coupled to the electrohydraulic actuator 130 and the brakes 150, and communicatively coupled to the brake controller 120. According to an exemplary embodiment, the braking subsystem 110 is a fully self-contained braking module that provides a fully brake-by-wire ("BbW") design. The self-contained BbW design (i) provides greater freedom in positioning the braking subsystem 110 and the brakes 150 on the vehicle 10 for optimal space management, (ii) provides cab firewalls to be fully closed and reduces noise transmission into the cab 30 by eliminating the need for a mechanical connection between a brake pedal in the cab 30 of the vehicle 10 and the traditionally mechanically-actuated master brake cylinder and/or brake valve, and (iii) provides functionality across multiple vehicle platforms, simplifying the design and reducing cost. In some embodiments, the braking system 100 has a partial BbW design (e.g., during autonomous operations, etc.) and additionally includes a manual or mechanical brake valve to facilitate traditional manual brake operations (e.g., during manual operations, etc.). In such embodiments, the braking system 100 may have a direct mechanical connection to the operator interface 40 (e.g., a brake pedal, a brake lever, etc.).

The brake controller 120 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 5, the brake controller 120 includes a processing circuit 122 and a memory 124. The processing circuit 122 may include an ASIC, one or more FPGAs, a DSP, circuits containing one or more processing components, circuitry for supporting a microprocessor, a group of processing components, or other suitable electronic processing components. In some embodiments, the processing circuit 122 is configured to execute computer code stored in the memory 124 to facilitate the activities described herein. The memory 124 may be any volatile or non-volatile computer-readable storage medium capable of storing data or computer code relating to the activities described herein. According to an exemplary embodiment, the memory 124 includes computer code modules (e.g., executable code, object code, source code, script code, machine code, etc.) configured for execution by the processing circuit 122. The functions and operations of the brake controller 120 are described in more detail herein with reference to FIGS. 4 and 6-8.

Figure 4:
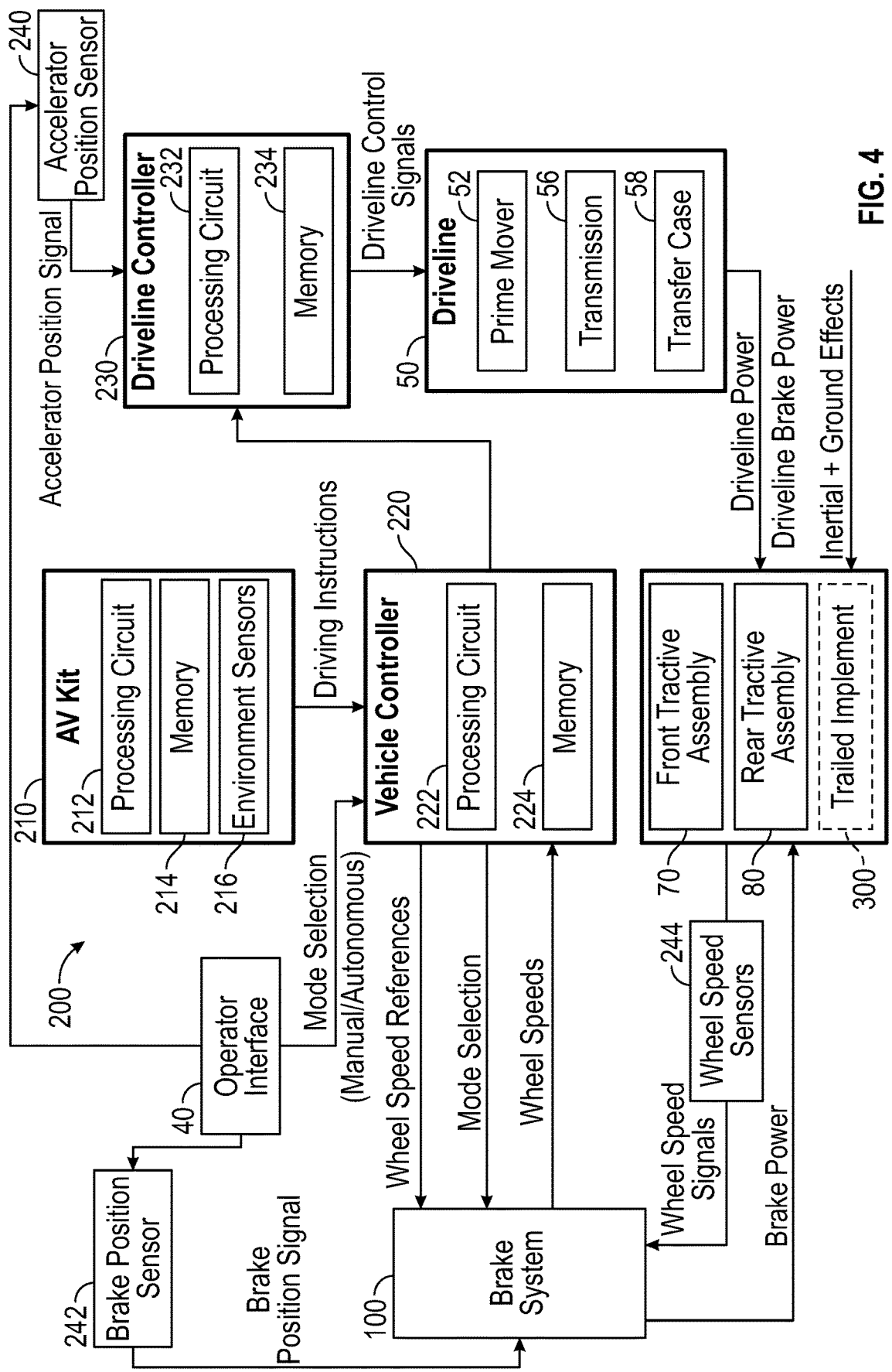
FIG. 4 is a schematic block diagram of a control system of the vehicle of FIG. 1, according to an exemplary embodiment.

According to an exemplary embodiment, the brakes 150 are positioned to facilitate selectively braking (i) one or more components of the front tractive assembly 70 and/or the rear tractive assembly 80 of the driveline 50 (e.g., the front axle 76, the front tractive elements 78, the rear axle 86, the rear tractive elements 88, etc.) and/or (ii) one or more components of a trailed implement (see, e.g., trailed implement 300 in FIG. 4). In some embodiments, the brakes 150 include (i) one or more front brakes positioned to facilitate braking one or more components of the front tractive assembly 70 and (ii) one or more rear brakes positioned to facilitate braking one or more components of the rear tractive assembly 80. In other embodiments, the brakes 150 include only the one or more front brakes. In some embodiments, the brakes 150 include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. The braking system 100 may thereby include one or more brakes to facilitate braking the front axle 76, the front tractive elements 78, the rear axle 86, and/or the rear tractive elements 88. In some embodiments, the brakes 150, in addition to the vehicle brakes, include one or more trailer brakes of a trailed implement that is coupled to the vehicle 10. The trailer brakes are positioned to facilitate selectively braking one or more axles and/or one or more tractive elements (e.g., wheels, etc.) of the trailed implement.

According to an exemplary embodiment, the brake valves 140 are configured to facilitate selectively providing brake pressure to or relieving brake pressure from the brakes 150 by facilitating the addition of hydraulic fluid thereto or by facilitating the removal of hydraulic fluid therefrom. In some embodiments, the brake valves 140 are or include flow controllers (e.g., mechanical spool valves, mechanical poppet valves, etc.) that are selectively repositionable relative to a housing. The flow controllers may be actuated (e.g., by the electrohydraulic actuator 130), may move in response to a hydraulic pressure overcoming a threshold level (e.g., associated with a biasing force provided by a spring, associated with a crack pressure, etc.), or may be otherwise repositionable relative to the housing. In other embodiments, the brake valves 140 are or include electromechanical valves that are electronically-controllable (e.g., openable, closable, etc. by the brake controller 120, by the electrohydraulic actuator 130, etc.).

In a first configuration, the brake valves 140 include a front dual brake valve and a rear dual brake valve that facilitate independent four-wheel-braking. By way of example, the front dual brake valve may facilitate independently controlling each of the front brakes associated with the front tractive elements 78, while the rear dual brake valve may facilitate independently controlling each of the rear brakes associated with the rear tractive elements 88. This configuration may provide a high degree of stability control, as well as facilitate differential steering using the brakes 150.

In a second configuration, the brake valves 140 include a dual brake valve that facilitates four-wheel cross-braking. By way of example, (i) a first valve of the dual brake valve may be coupled to (a) a front right brake associated with a front right tractive element 78 and (b) a rear left brake associated with a rear left tractive element 88 and (ii) a second valve of the dual brake valve may be coupled to (a) a front left brake associated with a front left tractive element 78 and (b) a rear right brake associated with a rear right tractive element 88.

In a third configuration, the brake valves 140 include a rear dual brake valve and a front single brake valve that facilitate independent rear braking plus front braking. By way of example, the rear dual brake valve may facilitate independently controlling each of the rear brakes associated with the rear tractive elements 88, while the front single brake valve may facilitate (i) simultaneously controlling the front brakes associated with the front tractive elements 78 and/or (ii) controlling the one or more front brakes associated with the front axle 76. Such a configuration may provide a high degree of stability control and brake assisted steering (e.g., differential steering on the rear axle 86 to augment the steering forces generated by a steered front axle 76, etc.). In an alternative configuration, the brake valves 140 include a front dual brake valve and a rear single brake valve that facilitate independent front braking plus rear braking.

In a fourth configuration, the brake valves 140 include only a rear brake valve. By way of example, the rear brake valve may be a rear single brake valve that facilitates (i) simultaneously controlling the rear brakes associated with the rear tractive elements 88 and/or (ii) controlling the one or more rear brakes associated with the rear axle 86. By way of another example, the rear brake valve may be a rear dual brake valve that facilitates independently controlling each of the rear brakes associated with the rear tractive elements 88. In an alternative configuration, the brake valves 140 include only a front brake valve (e.g., a single front brake valve, a dual front brake valve, etc.).

In a fifth configuration, the brake valves 140 include only a dual brake valve that facilitates bi-axle braking. By way of example, (i) a first valve of the dual brake valve may facilitate (a) simultaneously controlling the front brakes associated with the front tractive elements 78 and/or (ii) controlling the one or more front brakes associated with the front axle 76 and (ii) a second valve of the dual brake valve may facilitate (a) simultaneously controlling the rear brakes associated with the rear tractive elements 88 and/or (ii) controlling the one or more rear brakes associated with the rear axle 86.

In some embodiments (e.g., embodiments where the vehicle 10 is designed to pull a trailed implement, etc.) and in addition to any of the above-described configurations, the brake valves 140 include a trailer brake valve. The trailer brake valve may be configured to facilitate controlling the one or more trailer brakes (e.g., to brake a trailer axle, to brake trailer tractive elements, etc.). In the various configurations described herein, a single electrohydraulic actuator 130 may be used to supply hydraulic fluid to the brake valves 140, at least one of a plurality of electrohydraulic actuators 130 may be associated with two or more of the brake valves 140, or each brake valve 140 may be associated with its own respective electrohydraulic actuator 130. Further, while the braking subsystem 110 is described herein as including the electrohydraulic actuator 130, in other embodiments, the vehicle brakes and/or the trailer brakes may be pneumatically operated and coupled to an electropneumatic actuator (e.g., the vehicle brakes may be hydraulically operated and the trailer brakes may be pneumatically operated, both the vehicle brakes and the trailer brakes may be pneumatically operated, etc.).

Generally, the brake controller 120 is configured to operate the at least one electrohydraulic actuator 130 and/or the brake valves 140 (e.g., in embodiments where the brake valves 140 include an electromechanical actuator) to control brake forces provided by the brakes 150. In some embodiments, the brake controller 120 is configured to transmit an actuator control signal to each respective hydraulic actuator 130 and the brake valves 140 associated therewith will react to the operation of the hydraulic actuator 130 (e.g., mechanical brake valves). In other embodiments, the brake controller 120 is configured to transmit an actuator control signal to each respective electrohydraulic actuator 130 and each respective electrohydraulic actuator 130 is configured to transmit a valve control signal to the brake valve(s) 140 associated therewith (e.g., electromechanical brake valves). In still other embodiments, the brake controller 120 is configured transmit an actuator control signal to each respective electrohydraulic actuator 130 and a valve control signal to each respective brake valve 140 (e.g., electromechanical brake valves), independently. In some embodiments, the brake controller 120 is configured to implement an electronic braking control scheme (e.g., the electronic braking control system 800 described below) and the actuator control signal and/or the valve control signal includes the braking command 828 that allows the braking controller 120 to inhibit or reduce overspeed conditions.

Driveline and Braking System Control

As shown in FIGS. 4 and 5, the control system 200 includes (i) an autonomous vehicle ("AV") system, shown as AV kit 210, (ii) a second controller, shown as vehicle controller 220, (iii) a third controller, shown as driveline controller 230, and (iv) a plurality of sensors, shown as accelerator position sensor 240, brake position sensor 242, tractive element or wheel speed sensors 244, and brake pressure sensors 246. In other embodiments, the control system 200 includes more or fewer components. The accelerator position sensor 240 is configured (e.g., positioned, structured, designed, etc.) to (i) facilitate monitoring a position of an accelerator interface (e.g., an accelerator pedal, an accelerator lever, a joystick, etc.) of the operator interface 40 and (ii) provide an accelerator position signal to the driveline controller 230 based on the position of the accelerator interface. The brake position sensor 242 is configured (e.g., positioned, structured, designed, etc.) to (i) facilitate monitoring a position of a brake interface (e.g., a brake pedal, a brake lever, a joystick, etc.) of the operator interface 40 and (ii) provide a brake position signal to the brake controller 120 of the braking system 100 based on the position of the brake interface. The wheel speed sensors 244 are configured (e.g., positioned, structured, designed, etc.) to (i) facilitate monitoring a wheel speed of each of the front tractive elements 78 of the front tractive assembly 70, the rear tractive elements 88 of the rear tractive assembly 80, and/or the trailer tractive elements of the trailed implement 300 and (ii) provide wheel speed signals to the brake controller 120 of the braking system 100 based on the wheel speeds. In some embodiments, the wheel speed sensors 244 provide the wheel speed signals directly to the vehicle controller 220. The brake pressure sensors 246 are configured (e.g., positioned, structured, designed, etc.) to (i) facilitate monitoring a brake pressure at each of the brakes 150 and (ii) provide brake pressure signals to the brake controller 120 of the braking system 100 based on the brake pressures.

As shown in FIG. 4, the AV kit 210 includes a processing circuit 212, a memory 214, and environment sensors 216. The processing circuit 122 may include an ASIC, one or more FPGAs, a DSP, circuits containing one or more processing components, circuitry for supporting a microprocessor, a group of processing components, or other suitable electronic processing components. In some embodiments, the processing circuit 212 is configured to execute computer code stored in the memory 214 to facilitate the activities described herein. The memory 214 may be any volatile or non-volatile computer-readable storage medium capable of storing data or computer code relating to the activities described herein. According to an exemplary embodiment, the memory 214 includes computer code modules (e.g., executable code, object code, source code, script code, machine code, etc.) configured for execution by the processing circuit 212.

The environment sensors 216 of the AV kit 210 may include various sensors that acquire environment data about (i) the positioning of the vehicle 10 and/or the trailed implement 300 (e.g., GPS coordinates, pitch, roll, yaw, positioning of the vehicle 10 relative to the trailed implement 300, etc.) and/or (ii) the surrounding environment such as current and upcoming grade (e.g., an incline, a decline, uneven ground, etc.), current and upcoming ground type (e.g., dirt, mud, gravel, pavement, dry, wet, snow, etc.), object proximity (e.g., trees, roots, lakes, ponds, other vehicles, boulders, buildings/structures etc.), and/or weather conditions (e.g., humidity, temperature, precipitation, etc.). The environment sensors 216 may include, for example, a GPS, cameras, proximity sensors, a gyroscope, an accelerometer, a pitch sensor, a roll sensor, a temperature sensor, a humidity sensor, etc. In some embodiments, the AV kit 210 is configured to communicate with external systems via wireless communication protocols such as a weather-based system, a GPS-based system, a topography-based system, etc. to acquire additional environment data to supplement the environment data acquired by the environment sensors 216.

The AV kit 210 is configured to (i) acquire the environment data from the environment sensors 216 and/or the external systems and (ii) make high-level driving determinations based on the environment data. The high-level driving determinations may include vehicle speed decisions, vehicle turning decisions, and trailed implement positioning decisions. The AV kit 210 is further configured to provide driving instructions to the vehicle controller 220 based on the high-level driving determinations.

As shown in FIG. 4, the vehicle controller 220 includes a processing circuit 222 and a memory 224. The processing circuit 222 may include an ASIC, one or more FPGAs, a DSP, circuits containing one or more processing components, circuitry for supporting a microprocessor, a group of processing components, or other suitable electronic processing components. In some embodiments, the processing circuit 222 is configured to execute computer code stored in the memory 224 to facilitate the activities described herein. The memory 224 may be any volatile or non-volatile computer-readable storage medium capable of storing data or computer code relating to the activities described herein. According to an exemplary embodiment, the memory 224 includes computer code modules (e.g., executable code, object code, source code, script code, machine code, etc.) configured for execution by the processing circuit 222. According to an exemplary embodiment, the memory 224 is configured to store vehicle information regarding vehicle dynamics and functional capabilities of the vehicle 10 (e.g., top speed capability, braking capability, turning radius, vehicle size, vehicle mass, etc.).

As shown in FIG. 4, the vehicle controller 220 is coupled to the operator interface 40, the braking system 100 (i.e., the brake controller 120), the AV kit 210, and the driveline controller 230. The vehicle controller 220 is configured to receive a mode selection from the operator interface 40. By way of example, an operator of the vehicle 10 may select a manual operational mode via the operator interface 40 whereby the control system 200 facilitates manual operator control of acceleration, braking, and steering of the vehicle 10. By way of example, the operator of the vehicle may select an autonomous operational mode via the operator interface 40 whereby the acceleration, braking, and/or steering of the vehicle 10 is autonomously controlled by the braking system 100 and the control system 200 without requiring further operator input. The vehicle controller 220 is configured to provide an indication of the mode selection to the braking system 100 and/or the driveline controller 230.

During the manual operational mode, the vehicle controller 220 does not interact with the braking system 100 or the driveline controller 230 regarding acceleration, braking, or steering of the vehicle 10. During the autonomous operational mode, the vehicle controller 220 is configured to (i) receive the driving instructions from AV kit 210 and the wheel speeds from the brake controller 120, or directly from the wheel speed sensors 244, and (ii) determine whether to intervene with the driveline 50 and/or the braking system 100 to accommodate the driving instructions (e.g., drive at X miles-per-hour ("mph"), turn Y amount, etc.) based on the wheel speeds and the pre-stored vehicle information. In response to determining to intervene with the driveline 50 and/or the braking system 100 to accommodate the driving instructions, the vehicle controller 220 is configured to (i) determine wheel speed references for each of the front tractive elements 78 and/or the rear tractive elements 88 based on the vehicle information, the driving instructions, and/or the wheel speeds and (ii) provide commands and/or the wheel speed references to the driveline controller 230 and/or the brake controller 120. The wheel speed references indicate the speeds at which each of the front tractive elements 78 and/or each of the rear tractive elements 88 should rotate to accommodate the driving instructions.

By way of example, the driving instructions may indicate an increase in vehicle speed. The vehicle controller 220, in response, may be configured to determine the wheel speed references necessary to accommodate the increase in vehicle speed. By way of another example, the driving instructions may indicate a decrease in vehicle speed. The vehicle controller 220, in response, may be configured to determine the wheel speed references necessary to accommodate the decrease in vehicle speed. By way of yet another example, the driving instructions may indicate a turn or to steer in one direction to reposition the vehicle 10 and/or the trailed implement along a desired path. The vehicle controller 220, in response, may be configured to determine that (i) the wheel speed references for the tractive elements on a first side of the vehicle 10 should stay the same or increase and (ii) the wheel speed references for the tractive elements on an opposing second side of the vehicle 10 should stay the same (e.g., if the tractive elements on the first side will be increasing in speed) or decrease. Such unbalanced wheel speed references between the left and right sides of the vehicle 10 may accommodate turning the vehicle 10 using differential speeds at the left and right sides (e.g., in place of or to supplement steered tractive elements, etc.).

In some embodiments, the vehicle controller 220 is configured to determine whether (i) the driveline 50 should provide driveline power to the front tractive assembly 70 and/or the rear tractive assembly 80, (ii) the driveline 50 should provide driveline brake power to the front tractive assembly 70 and/or the rear tractive assembly 80, and/or (iii)

the braking system 100 should provide brake power to the front tractive assembly 70, the rear tractive assembly 80, and/or the trailed implement 300 to accommodate the driving instructions (e.g., based on the vehicle information, the wheel speeds, and the wheel speed references). In some instances, the vehicle controller 220 may determine that no adjustment of the driveline power, the driveline brake power, or the brake power is necessary to accommodate the driving instructions. By way of example, the vehicle 10 may already be operating along a path or at a speed indicated by the driving instructions. By way of another example, the vehicle controller 220 may determine that the inertial and ground effects on the vehicle 10 and/or the trailed implement 300 are sufficient to slow or speed up the vehicle 10 as required by the driving instructions without intervention of the driveline 50 and/or the braking system 100. In some embodiments, the driveline power and driveline brake power decisions are performed by the driveline controller 230 (e.g., similar to how the brake controller 120 determines the brake power decisions as described in greater detail herein).

As shown in FIG. 4, the driveline controller 230 includes a processing circuit 232 and a memory 234. The processing circuit 232 may include an ASIC, one or more FPGAs, a DSP, circuits containing one or more processing components, circuitry for supporting a microprocessor, a group of processing components, or other suitable electronic processing components. In some embodiments, the processing circuit 232 is configured to execute computer code stored in the memory 234 to facilitate the activities described herein. The memory 234 may be any volatile or non-volatile computer-readable storage medium capable of storing data or computer code relating to the activities described herein. According to an exemplary embodiment, the memory 234 includes computer code modules (e.g., executable code, object code, source code, script code, machine code, etc.) configured for execution by the processing circuit 232.

As shown in FIG. 4, the driveline controller 230 is coupled to the driveline 50, the vehicle controller 220, and the accelerator position sensor 240. The driveline controller 230 is configured to receive the mode selection from the vehicle controller 220 (e.g., the manual operational mode, the autonomous operational mode, etc.). During the manual operational mode, the driveline controller 230 is configured to receive the accelerator position signal from the accelerator position sensor 240 and control operation of the driveline 50 based on the accelerator position signal. By way of example, the driveline controller 230 may be configured to increase or decrease the output of the prime mover 52 and/or change a setting of the transmission 56 (e.g., increase current gear, decrease current gear, change current CVT arrangement, etc.) to accommodate an increased or decreased accelerator position signal. The driveline controller 230 may also be configured to change a setting of the transmission 56 and/or the transfer case 58 (e.g., four-wheel-drive, rear-wheel-drive, front-wheel-drive, etc.) based on an input received at the operator interface 40 during the manual operational mode.

During the autonomous operational mode, the driveline controller 230 is configured to (i) receive driveline commands from the vehicle controller 220 and (ii) control the driveline 50 based on the driveline commands to assist in implementing the driving instructions provided by the AV kit 210. In some instances, the driveline command from the vehicle controller 220 does not include intervention. By way of example, the vehicle controller 220 may determine that the vehicle 10 needs to be slowed down, but that the necessary braking will be performed by the braking system 100. By way of another example, the vehicle controller 220 may determine that the inertial and ground effects on the vehicle 10 and/or the trailed implement 300 are sufficient to slow or speed up the vehicle 10 and may not command an input from the driveline 50.

In some instances, the driveline command received from the vehicle controller 220 is a speed reduction command to provide driveline brake power to the front tractive assembly 70 and/or the rear tractive assembly 80 to supplement or replace brake power provided by the braking system 100 to reduce the speed of or stop the vehicle 10. By way of example, the vehicle controller 220 may determine that the vehicle 10 needs to slow down and that driveline brake power is sufficient to slow the vehicle 10 down. By way of another example, the vehicle controller 220 may determine that the vehicle 10 needs to slow down and that driveline brake power is required to supplement the brake power of the braking system 100 to slow the vehicle 10 down. Accordingly, in response to the speed reduction command, the driveline controller 230 is configured to reduce an output of the prime mover 52 and/or change a setting of the transmission 56 (e.g., transition to a lower gear setting, etc.) to affect a reduced speed at front tractive elements 78 and the rear tractive elements 88, thereby, slowing the vehicle 10.

In some instances, the driveline command received from the vehicle controller 220 is a speed increase command to provide driveline power to the front tractive assembly 70 and/or the rear tractive assembly 80 to increase the speed of the vehicle 10. By way of example, the vehicle controller 220 may determine that the vehicle 10 needs to speed up. Accordingly, in response to the speed increase command, the driveline controller 230 is configured to increase an output of the prime mover 52 and/or change a setting of the transmission 56 (e.g., transition to a higher gear setting, etc.) to affect an increased speed at front tractive elements 78 and the rear tractive elements 88, thereby, increasing the speed of the vehicle 10.

In some instances and in embodiments where the tractive elements are independently drivable, the driveline command received from the vehicle controller 220 is a turn command to (i) provide driveline power to the tractive elements along one side of the vehicle 10 to increase the speed of the tractive elements along the one side of the vehicle 10 and/or (ii) provide driveline brake power to the tractive elements along the opposite side of the vehicle 10 to decrease the speed of the tractive elements along the opposite side of the vehicle 10 to initiate differential steering (alone or in combination with the braking system 100).

As shown in FIGS. 4 and 5, the brake controller 120 is coupled to the electrohydraulic actuator 130, the brake valves 140, the vehicle controller 220, the brake position sensor 242, and the brake pressure sensors 246. The brake controller 120 is configured to receive the mode selection from the vehicle controller 220 (e.g., the manual operational mode, the autonomous operational mode, etc.). In some embodiments (e.g., when the brake system 100 is a pure BbW design, etc.) and during the manual operational mode, the brake controller 120 is configured to receive the brake position signal from the brake position sensor 242 and control operation of the at least one electrohydraulic actuator 130 and the one or more brake valves 140 based on the brake position signal. By way of example, the brake controller 120 may be configured to operate the electrohydraulic actuator 130 and the brake valves 140 to increase an amount (e.g., volume, pressure, etc.) of hydraulic fluid provided to the brakes 150 and, thereby, increase a brake force applied by the brakes 150 to accommodate an increased brake position signal. By way of another example, the brake controller 120 may be configured to operate the electrohydraulic actuator 130 and the brake valves 140 to decrease an amount of hydraulic fluid provided to or remove an amount of hydraulic fluid from the brakes 150 and, thereby, decrease a brake force applied by the brakes 150 to accommodate a decreased brake position signal. In other embodiments (e.g., when the brake system 100 includes a manual or mechanical brake valve, etc.) and during the manual mode of operation, the operation of the brakes 150 is manually controlled using a mechanical or hydromechanical path from the brake interface of the operator interface to the manual or mechanical brake valve to control the pressures at the brakes 150.

During the autonomous operational mode, the brake controller 120 is configured to (i) receive brake system commands and/or the wheel speed references from the vehicle controller 220 and (ii) control the electrohydraulic actuator 130 and the brake valves 140 based on the brake system commands and/or the wheel speed references to assist in implementing the driving instructions provided by the AV kit 210. In some embodiments during the autonomous mode, the brake controller 120 operates independent of the driveline controller 230 and based solely on the wheel speed references provided by the vehicle controller 220. In some embodiments during the autonomous mode, the vehicle controller 220 provides high-level commands to the brake controller 120 based on the driveline commands the vehicle controller 220 provides to the driveline controller 230 and then the brake controller 120 operates based on the wheel speed references and in view of the high-level brake system commands.

In some instances, the high-level brake system command received from the vehicle controller 220 is to disengage (i.e., to disregard any differences between the wheel speeds and the wheel speed references and refrain from engaging the brakes 150). By way of example, the vehicle controller 220 may determine that the vehicle 10 needs to be slowed down, but the necessary braking can be performed by the driveline 50. By way of another example, the vehicle controller 220 may determine that the inertial and ground effects on the vehicle 10 and/or the trailed implement 300 are sufficient to slow or speed up the vehicle 10 and no input from the braking system 100 is necessary.

In some instances, the high-level brake system command received from the vehicle controller 220 is to operate according to the wheel speed references. In such instances, the brake controller 120 is configured to (i) determine the wheels speeds at one or more of the front tractive elements 78 and one or more of the rear tractive elements 88 based on the wheel speed signals received from the wheel speed sensors 244 and (ii) compare the wheel speed references received from the vehicle controller 220 to the wheel speeds to develop a control strategy for the brakes 150. If the wheel speed reference for a tractive element is greater than the wheel speed of the tractive element, the brake controller 120 is configured to take no action or relieve/inactivate braking by operating the electrohydraulic actuator 130 and the brake valves 140 to decrease an amount of hydraulic fluid provided to or remove an amount of hydraulic fluid from the brakes 150 and, thereby, decrease or eliminate a brake force applied by the brakes 150 to allow the vehicle 10 to accelerate up to a higher speed as indicated by the wheel speed references being greater than the wheel speeds.

If the wheel speed references for the tractive elements are less than the wheel speeds of the tractive elements, the brake controller 120 is configured to activate or increase braking by operating the electrohydraulic actuator 130 and the brake valves 140 to increase an amount of hydraulic fluid provided to the brakes 150 and, thereby, increase a brake force applied by the brakes 150 to slow the vehicle 10 down until the wheel speed references and the wheel speeds converge and are the same or substantially the same. In some instances, the wheel speed references may be unbalanced between the left and right sides of the vehicle 10 to accommodate turning using differential wheel speeds (e.g., in place of or to supplement steered tractive elements, based on differential ground conditions, etc.). In such instances, the brake controller 120 may be configured to control the electrohydraulic actuator 130 and the brake valves 140 to provide different hydraulic braking pressures to the brakes 150 along the right and left sides of the vehicle 10 based on the wheel speed references.

In some embodiments (during the manual operational mode and/or the autonomous operational mode), the brake controller 120 is configured to (i) monitor the wheel speeds and (ii) selectively provide brake power to the front tractive assembly 70 (e.g., an individual front tractive element 78, the front axle 76, etc.) and/or the rear tractive assembly 80 (e.g., an individual rear tractive element 88, the rear axle 86, etc.) in response to the wheel speed of at least one tractive element increasing at a first rate greater than a first threshold rate, indicating a potential loss of traction, to provide a traction control capability. By way of example, the brake controller 120 may be configured to control the electrohydraulic actuator 130 and the brake valves 140 to engage the appropriate brakes 150 to (i) brake the axle including a respective tractive element that has lost traction or (ii) brake the respective tractive element that has lost traction to help the respective tractive element regain traction. However, by doing so, the vehicle 10 and, thereby, the trailed implement 300 may start to veer off a desired path (which may be of critical importance in some implementations of the vehicle 10) because of the slowed tractive element (i.e., inadvertent differential steering). Accordingly, in instances where adherence to the desired path is critical, the brake controller 120 may not brake the respective tractive element that has actually lost traction. Instead, the brake controller 120 may be configured to control the electrohydraulic actuator 130 and the brake valves 140 to engage the appropriate brake 150 to brake the tractive element that is opposite the respective tractive element that has lost traction. This will in turn counteract the side of the vehicle 10 that is slowing down because of the loss of traction by slowing down the side of the vehicle 10 that is not slipping and, therefore, maintain alignment along the desired path. For example, a right side tractive element may lose traction, which will slow down the right side of the vehicle 10, causing the vehicle 10 to start veering off to the right. Braking the right side tractive element could further exacerbate the veering off to the right by further slowing the right side of the vehicle 10. Instead, the brake controller 120 may brake the left side tractive element, opposite the right side tractive element, to slow the left side of the vehicle 10 to counteract the slowing of the right side of the vehicle 10 due to the loss of traction, maintaining the vehicle 10 along the desired path.

In some embodiments (during the manual operational mode and/or the autonomous operational mode), the brake controller 120 is configured to (i) monitor the wheel speeds and (ii) selectively relieve brake power applied to the front tractive assembly 70 (e.g., an individual front tractive element 78, the front axle 76, etc.), the rear tractive assembly 80 (e.g., an individual rear tractive element 88, the rear axle 86, etc.), and/or one or more components of the trailed implement 300 (e.g., one or more axles, one more tractive elements, etc. of the trailed implement 300) in response to the wheel speed of at least one tractive element decreasing at a second rate greater than a second threshold rate indicating that the at least one tractive element has locked up to provide an ABS capability. By way of example, a tractive element of the vehicle 10 and/or the trailed implement 300 may lock up or stop rotating during the application of force by the brakes 150. In such an instance, the brake controller 120 may be configured to control the electrohydraulic actuator 130 and the brake valves 140 to relieve brake pressure at the brake 150 associated with the tractive element that has locked up or stopped rotating to allow the tractive element to start rotating again.

In some embodiments, the functions of the vehicle controller 220 and the driveline controller 230 are performed by a single controller. In some embodiments, the functions of the AV kit 210 and the vehicle controller 220 are performed by a single controller. In some embodiments, the functions of the AV kit 210, the vehicle controller 220, and the driveline controller 230 are performed by a single controller. In some embodiments, the functions of the brake controller 120, the vehicle controller 220, and the driveline controller 230 are performed by a single controller. In some embodiments, the functions of the brake controller 120, the AV kit 210, the vehicle controller 220, and the driveline controller 230 are performed by a single controller.

Methods

Figure 6:
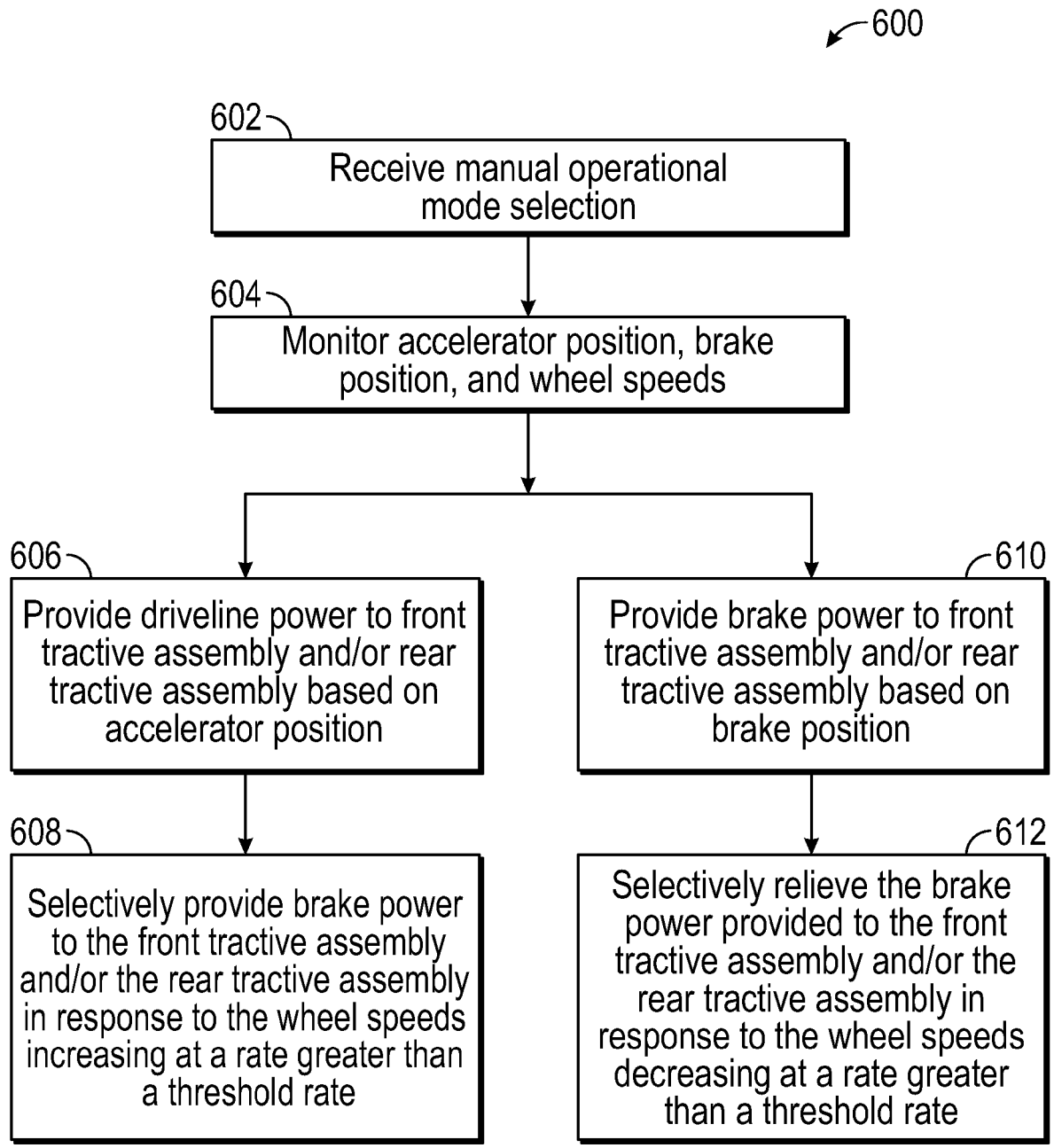
FIG. 6 shows a block diagram of a method for manually operating a driveline and a braking system of the vehicle of FIG. 1, according to an exemplary embodiment.

Referring now to FIG. 6, a method 600 for manually operating a driveline and a braking system of a vehicle is shown according to an example embodiment. In one example embodiment, the method 600 is implemented with the vehicle 10, the driveline 50, the braking system 100, and the control system 200 of FIGS. 1-5. As such, method 600 may be described with regard to FIGS. 1-5.

At step 602, a control system (e.g., the control system 200, the vehicle controller 220, etc.) of a vehicle (e.g., the vehicle 10, etc.) is configured to receive a selection of a manual operational mode (e.g., based on an input received at the operator interface 40, etc.). At step 604, (i) the control system (e.g., the driveline controller 230, the vehicle controller 220, etc.) is configured to monitor a position of an accelerator interface (e.g., an accelerator pedal, lever, joystick, etc. of the operator interface 40) based on an accelerator position signal acquired from an accelerator position sensor (e.g., the accelerator position sensor 240, etc.), (ii) the control system (e.g., the brake controller 120, the vehicle controller 220, etc.) is configured to monitor a position of a brake interface (e.g., a brake pedal, lever, joystick, etc. of the operator interface 40) based on a brake position signal acquired from a brake position sensor (e.g., the brake position sensor 242, etc.), and (iii) the control system (e.g., the brake controller 120, the vehicle controller 220, etc.) is configured to monitor wheel speeds of tractive elements of the vehicle and/or a trailed implement (e.g., the front tractive elements 78, the rear tractive element 88, the tractive element of the trailed implement 300, etc.) based on wheel speed signals acquired from wheel speed sensors (e.g., the wheel speed sensors 244, etc.).

At step 606, the control system (e.g., the vehicle controller 220, the driveline controller 230, etc.) is configured to provide driveline power with a driveline of the vehicle (e.g., the driveline 50, the prime mover 52, the transmission 56, the transfer case 58, etc.) to one or more components of a front tractive assembly (e.g., the front tractive assembly 70, the front drive shaft 72, the front differential 74, the front axle 76, the front tractive elements 78, etc.) and/or a rear tractive assembly (e.g., the rear tractive assembly 80, the rear drive shaft 82, the rear differential 84, the rear axle 86, the rear tractive elements 88, etc.) of the vehicle based on the position of the accelerator interface. At step 608, the control system (e.g., the brake controller 120, the vehicle controller 220, etc.) is configured to selectively provide brake power with a braking system (e.g., the braking system 100, the electrohydraulic actuator 130, the brake valves 140, the brakes 150, etc.) of the vehicle to one or more components (e.g., tractive elements, axle, etc.) of the front tractive assembly and/or the rear tractive assembly of the vehicle in response to the wheel speed of at least one tractive element increasing at a rate greater than a threshold rate (e.g., slipping, losing traction, to provide a traction control capability, etc.).

At step 610, the control system (e.g., the brake controller 120, the vehicle controller 220, etc.) is configured to provide brake power with the braking system of the vehicle to one or more components of the front tractive assembly and/or the rear tractive assembly of the vehicle based on the position of the brake interface. At step 612, the control system (e.g., the brake controller 120, the vehicle controller 220, etc.) is configured to selectively relieve the brake power provided to one or more components (e.g., tractive elements, axle, etc.) of the front tractive assembly and/or the rear tractive assembly of the vehicle in response to the wheel speed of at least one tractive element decreasing at a rate greater than a threshold rate (e.g., stopping, locking, to provide an ABS capability, etc.).

Figure 7:
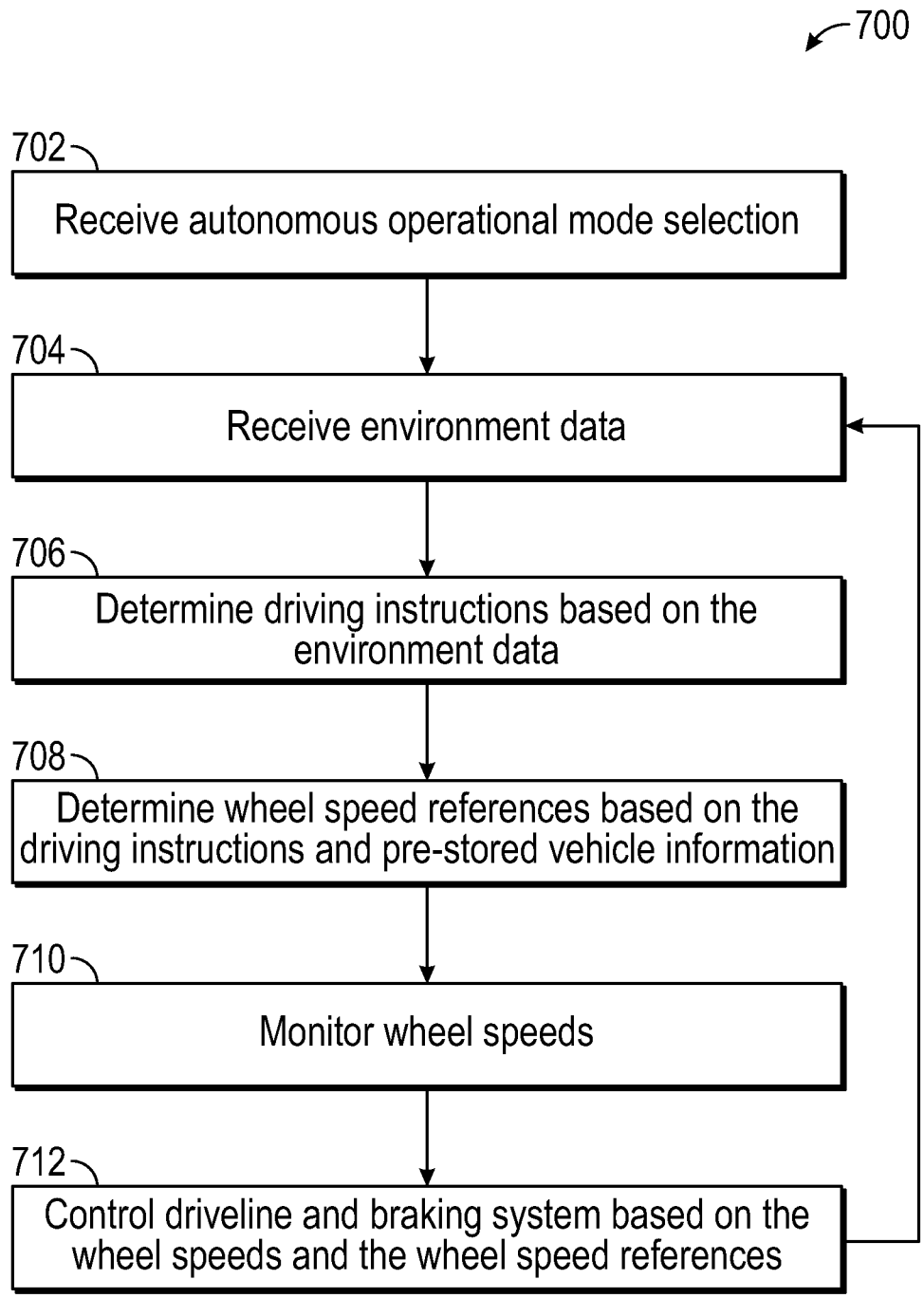
FIGS. 7 and 8 show a block diagram of a method for autonomously operating a driveline and a braking system of the vehicle of FIG. 1, according to an exemplary embodiment.
Figure 8:
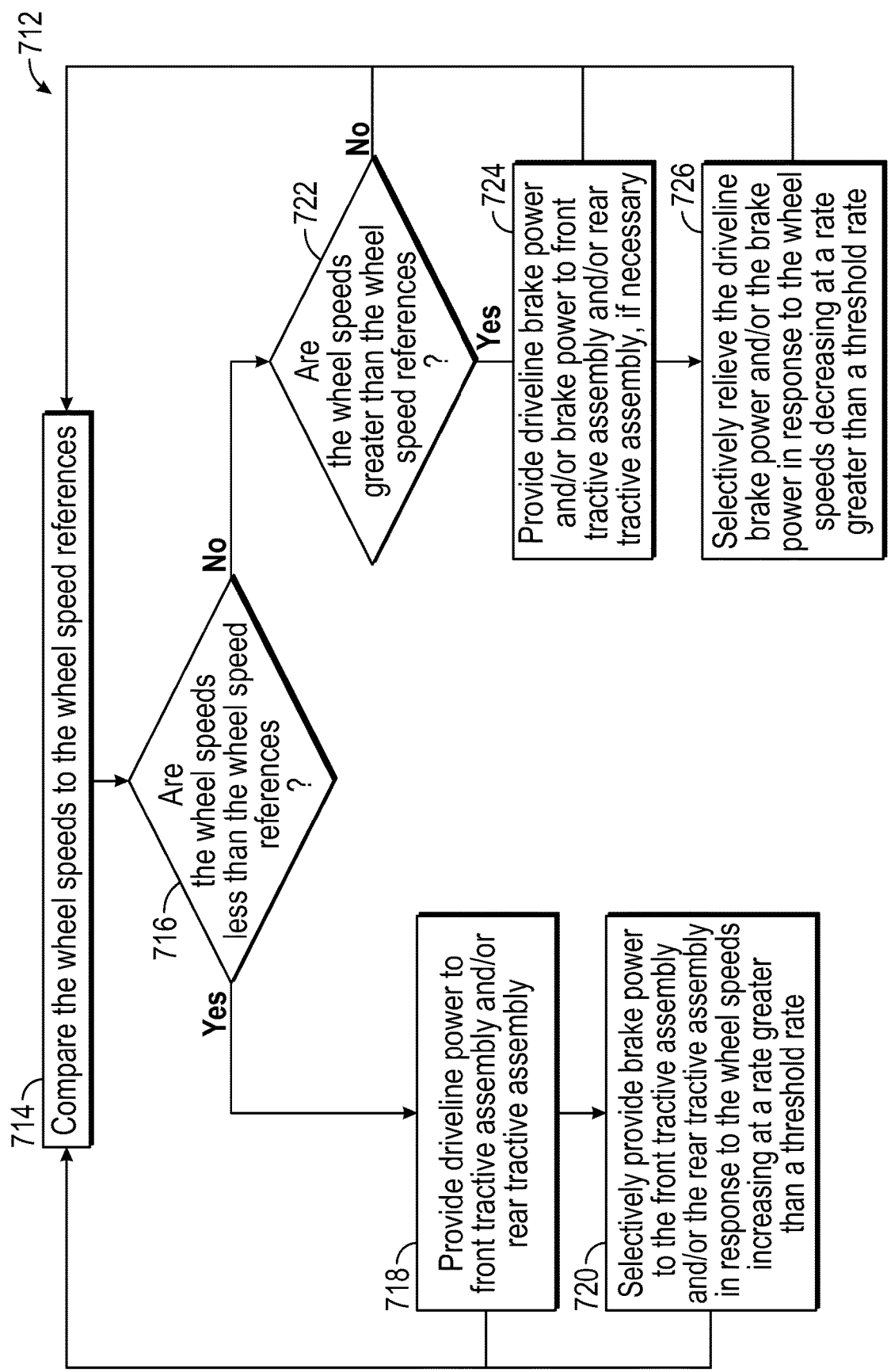

Referring now to FIGS. 7 and 8, a method 700 for autonomously operating a driveline and a braking system of a vehicle is shown according to an example embodiment. In one example embodiment, the method 700 is implemented with the vehicle 10, the driveline 50, the braking system 100, and the control system 200 of FIGS. 1-5. As such, method 700 may be described with regard to FIGS. 1-5.

At step 702, a control system (e.g., the control system 200, the vehicle controller 220, etc.) of a vehicle (e.g., the vehicle 10, etc.) is configured to receive a selection of an autonomous operational mode (e.g., based on an input received at the operator interface 40, etc.). At step 704, (i) the control system (e.g., the AV kit 210, the vehicle controller 220, etc.) is configured to receive or acquire environmental data from environment sensors (e.g., the environment sensors 216, etc.) and/or external systems (e.g., a weather-based system, a GPS-based system, a topography-based system, etc.). The environment data may include data regarding the positioning of the vehicle and/or a trailed implement of the vehicle (e.g., the trailed implement 300, etc.) such as GPS coordinates, pitch, roll, yaw, positioning of the vehicle relative to the trailed implement 300, etc. The environment data may also include data regarding the surrounding environment such as current and upcoming grade (e.g., an incline, a decline, uneven ground, etc.), current and upcoming ground type (e.g., dirt, mud, gravel, pavement, dry, wet, snow, etc.), object proximity (e.g., trees, roots, lakes, ponds, other vehicles, boulders, buildings/structures etc.), and/or weather conditions (e.g., humidity, temperature, precipitation, etc.).

At step 706, the control system (e.g., the AV kit 210, the vehicle controller 220, etc.) is configured to determine high-level driving instructions based on the environment data. The driving instructions may include determinations such as vehicle speed decisions, vehicle turning decisions, trailed implement positioning decisions, etc. At step 708, the control system (e.g., the vehicle controller 220, etc.) is configured to determine wheel speed references based on the driving instructions and pre-stored vehicle information. At step 710, the control system (e.g., the brake controller 120, the vehicle controller 220, etc.) is configured to monitor wheel speeds of tractive elements of the vehicle and/or the trailed implement (e.g., the front tractive elements 78, the rear tractive element 88, the tractive element of the trailed implement 300, etc.) based on wheel speed signals acquired from wheel speed sensors (e.g., the wheel speed sensors 244, etc.). At step 712, the control system (e.g., the vehicle controller 220, the driveline controller 230, the brake controller 120, etc.) is configured to control a driveline of the vehicle (e.g., the driveline 50, the prime mover 52, the transmission 56, the transfer case 58, etc.) and a braking system (e.g., the braking system 100, the electrohydraulic actuator 130, the brake valves 140, the brakes 150, etc.) of the vehicle based on the wheel speeds and the wheel speed references. Step 712 include steps 714-26, which are described in greater detail below.

At step 714, the control system (e.g., the vehicle controller 220, the brake controller 120, etc.) is configured to compare the wheel speeds to the wheel speed references. At step 716, the control system (e.g., the vehicle controller 220, the brake controller 120, etc.) is configured to determine whether the wheel speeds are less than the wheel speed references. If yes, the control system proceeds to step 718. If no, the control system proceeds to step 722. At step 718, the control system (e.g., the vehicle controller 220, the driveline controller 230, etc.) is configured to provide driveline power with the driveline to one or more components of a front tractive assembly (e.g., the front tractive assembly 70, the front drive shaft 72, the front differential 74, the front axle 76, the front tractive elements 78, etc.) and/or a rear tractive assembly (e.g., the rear tractive assembly 80, the rear drive shaft 82, the rear differential 84, the rear axle 86, the rear tractive elements 88, etc.) of the vehicle in response to the wheel speeds being less than the wheel speed references. At step 720, the control system (e.g., the brake controller 120, the vehicle controller 220, etc.) is configured to selectively provide brake power with the braking system to one or more components (e.g., tractive elements, axles, etc.) of the front tractive assembly and/or the rear tractive assembly of the vehicle in response to the wheel speed of at least one tractive element increasing at a rate greater than a threshold rate (e.g., slipping, losing traction, to provide a traction control capability, etc.).

At step 722, the control system (e.g., the vehicle controller 220, the brake controller 120, etc.) is configured to determine whether the wheel speeds are greater than the wheel speed references. If yes, the control system proceeds to step 724. If no, the control system proceeds to step 714. At step 724, the control system (e.g., the brake controller 120, the vehicle controller 220, etc.) is configured to provide driveline brake power with the driveline and/or brake power with the braking system of the vehicle to one or more components of the front tractive assembly and/or the rear tractive assembly of the vehicle in response to the wheel speeds being greater than the wheel speed references, if necessary. At step 726, the control system (e.g., the brake controller 120, the vehicle controller 220, etc.) is configured to selectively relieve the driveline brake power and/or the brake power provided to the one or more components (e.g., tractive elements, axle, etc.) of the front tractive assembly and/or the rear tractive assembly of the vehicle in response to the wheel speed of at least one tractive element decreasing at a rate greater than a threshold rate (e.g., stopping, locking, to provide an ABS capability, etc.).

Electronic Braking System

A correlation exists between the driveline 50 and the braking system 100 of the vehicle 10 and the two systems cooperate when acting to avoid driving through the service brakes 150. For example, the transmission 56 (e.g., a continuously variable transmission or CVT) can recirculate torque back to the engine or prime mover 52 to utilize engine braking to slow the vehicle 10. However, the use of engine braking can lead to an increased engine speed. Under load, when descending a steep grade, or during other use conditions, the increased engine speed can lead to an overspeed condition. In some embodiments, an overspeed condition is defined as an engine RPM above a manufacturer's provided set point. In some embodiments, an overspeed condition is defined as any engine speed above a commanded engine speed, for example as set by an autonomous vehicle control system, an operator foot pedal, or another input device. For example, a vehicle controller (e.g., an ECM) may command an engine speed no higher than 2,500 RPM, and any engine speed value above 2,500 RPM is considered an overspeed condition. In some embodiments, a vehicle overspeed condition is considered. For example, an autonomous vehicle controller may command the vehicle 10 to travel at ten miles per hour, and any vehicle speed above ten miles per hour is considered an overspeed condition. Again, the driveline 50 and the braking system 100 work together. If the vehicle 10 attempts to use engine braking to slow the vehicle speed to avoid a vehicle overspeed condition, the action of engine braking may lead to an engine overspeed condition. An electronic braking control scheme that can coordinate the actions of the driveline 50 and the braking system 100 addresses the complicated and interwoven natures of these systems and the desire to provide a vehicle system that avoids both vehicle overspeed and engine overspeed.

In some embodiments, the brake controller 120 is structured to provide coordinated engine and service braking to control the vehicle 10. For example, the brake controller 120 can control the braking subsystem 110 including service brakes as described above. In some embodiments, the electronic braking system described below can function independently or with another braking subsystem. The electronic braking system is structured to work with manually operated braking subsystems 110 where an operator physically actuates a brake pedal during normal operation, and with automated braking subsystems that are included as a part of a larger autonomous driving system. In some embodiments, the electronic braking system is switchable between an automated driving mode and a manual braking mode depending on how the vehicle 10 is being used. Additionally, in some embodiments, the electronic braking system is structured to cooperate with the trailed implement 300 to provide coordinated braking capabilities.

Figure 9:
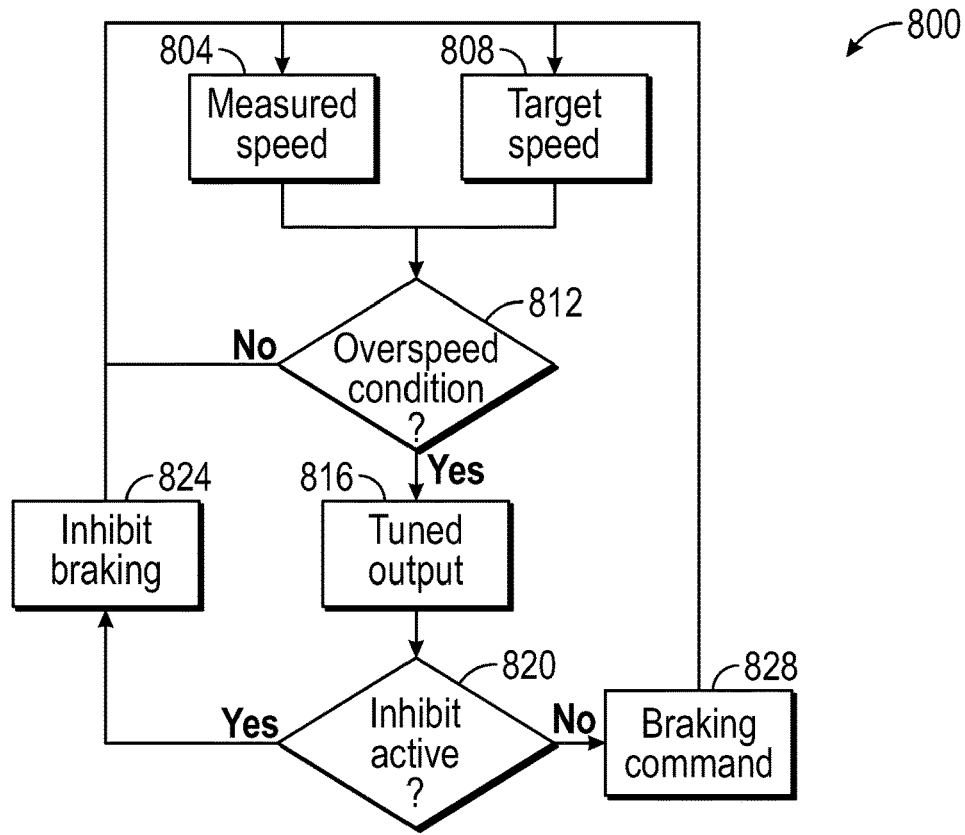
FIG. 9 is a block diagram of a method of operating an electronic braking system, according to an exemplary embodiment.

As shown in FIG. 9, an electronic braking control scheme 800 can be implemented by the braking controller 120. At step 804, a speed is determined using a speed sensor. The speed sensor can be a single sensor or a sensor array and may include physical and/or virtual sensors positioned and arranged to determine the speed. In one embodiment, the speed sensor includes the wheel speed sensor 244 connected to the vehicle controller 220 and/or the driveline controller 230 to determine the speed. In another embodiment, the speed is determined based on information received from a transmission output speed sensor and an axle ratio. In still other embodiments, the speed sensor includes the wheel speed sensor 244 described above, and is used differently to determine the speed. The outputs of the wheel speed sensors can be used to determine a vehicle speed, or the wheel rotation speed may be utilized by the electronic braking control scheme 800. In some embodiments, the speed sensor includes an engine speed sensor structured to detect the rotations per minute (RPM) of the engine or prime mover 52. The speed sensor is structured to output and transmit a speed sensor signal indicative of the speed (e.g., a vehicle or wheels speed, an engine speed, etc.).

At step 808, the electronic braking control scheme 800 determines a target speed associated with the speed determined in step 804. In some embodiments, the target speed includes a target vehicle speed (e.g., 10 miles per hour). In some embodiments, the target speed includes a target engine speed (e.g., 2,300 RPM). In some embodiments, the target speed is determined based on signals received from a sensor or sensor array (e.g., the accelerator position sensor 240). For example, if the operator arranges the accelerator pedal or another input device at a 50% position, a target speed may be determined associated with the 50% position. In some embodiments, the target speed is commanded by an autonomous driving system, a fleet management system, a cruise control system, or another vehicle system that provides control to the vehicle 10. For example, the target engine speed may be determined by a manufacturer of the engine or prime mover 52. In some embodiments, an autonomous driving system (e.g., the autonomous driving kit 210) commands the target speed (e.g., target vehicle speed and/or target engine speed). The electronic braking control scheme 800 functions with either autonomous, semi-autonomous, manually operated vehicle systems, or combinations of these systems. For example, the operator may select from different modes using the operator interface 40 and the electronic braking control scheme 800 continues operation.

At steps 804 and 808, the speed and the target speed are determined. At step 812, the electronic braking control scheme 800 compares the speed and the target speed and determines if an overspeed condition exists. In some embodiments, an overspeed condition indicates that the vehicle 10 is travelling faster than it is commanded too. For example, if the vehicle 10 has a target speed of 10 miles per hour, and the determined speed is 14 miles per hour, an overspeed condition exists. In another example, if the target engine speed is 2,300 RPM and the determined speed is 3,000 RPM, and overspeed condition exists. In some embodiments, the comparison of the speed and the target speed includes subtracting the target speed from the speed to determine a speed differential. If the speed differential is positive, it indicates an overspeed condition. In some embodiments, the electronic braking control scheme 800 monitors the speed and target speed over time and a rate of change or trend analysis is used in the determination of the overspeed condition. In some embodiments, environmental conditions (e.g., slope, grade, pitch, traction conditions, etc.), loading conditions (e.g., a determined weight or load of the vehicle 10, towing loads, etc.), and other conditions may affect the determination of an overspeed condition. In some embodiments, a trend that indicates an upcoming overspeed condition can be used to predict an overspeed condition before it exists and preemptively control a braking system to avoid the overspeed condition. In some embodiments, a machine learning or model predictive control engine receives inputs including the speed, the target speed, and other conditions or information (e.g., environmental, load, look ahead, vehicle-to-vehicle (V2V), vehicle-to-X (V2X), etc.) and determines an overspeed condition. For example, the electronic braking control scheme 800 may account for an age of the brakes, an age of the vehicle, operational tendencies of an operator or fleet, historical information of a specific farm or crop field, mine or construction site, traffic information, weather information, etc.

If no overspeed condition is determined at step 812, then the electronic braking control scheme 800 returns to steps 804 and 808 and continues to monitor for an overspeed condition at step 812. If an overspeed condition is detected at step 812, then a tuned output is generated at step 816. The tuned output may include weighted averages or proportional outputs based on the overspeed condition. For example, if both engine speed and vehicle speed are being monitored, then the engine speed may be given priority based on a weighted average. In some embodiments, the tuned output is affected by secondary considerations (e.g., age of the brakes, an age of the vehicle, operational tendencies of an operator or fleet, historical information of a specific farm or crop field, mine or construction site, traffic information, weather information, etc.) and the output from step 816 is based at least in part on the secondary information. For example, if a vehicle speed is 4 miles per hour faster than the target vehicle speed, the electronic braking control scheme 800 may assign a score or value of 4 at step 812, and the tuned output may alter the value in step 816. For example, if the vehicle speed is increasing over time above a threshold, then the tuned value may indicate a larger value.

At step 820, the electronic braking control scheme 800 determines if an inhibit condition is active. The inhibit condition can include operator actions or preset determinations that inhibit jackknifing of a trailer load, skidding control, traction control, or other braking subsystems that may command the electronic braking control scheme 800 to inhibit action. In one example, if it is desirable to utilize trailer brakes and not the service brakes 150, then the inhibit command may be active. If the inhibit command is active, then the electronic braking control scheme 800 inhibits braking 824 at step 824. In some embodiments, the inhibit braking command sent at step 824 does not completely inhibit the application of the service brakes 150. Rather, the inhibit braking command may limit the application of the service brakes 150 to inhibit the occurrence of an undesirable effect (e.g., a jackknife, a skid, etc.).

If the inhibit command is not active, then the electronic braking control scheme 800 outputs a braking command at 828. The braking command is based on the tuned output provided at step 816. In some embodiments, a PID control receives the tuned output and generates an electronic braking signal (i.e., the braking command) that is received by the braking subsystem 110 to be realized in application of the service brakes 150 according to the electronic braking signal. In some embodiments, the braking command is generated by a simple logic circuit, a PID, a machine learning policy (e.g., reinforcement learning, neural network, deep neural network, etc.), a model predictive control scheme, or another control, as desired.

Once the braking command is sent at step 828, it is received by the braking subsystem and enacted as a braking action with the service brakes 150. While the electronic braking control scheme 800 is structured to function with the braking systems described above, it is also practicable with wholly different braking and vehicle systems, as desired. For example, the electronic braking control scheme 800 could be implemented with a tracked vehicle and brakes that are other than service brakes.

Figure 10:
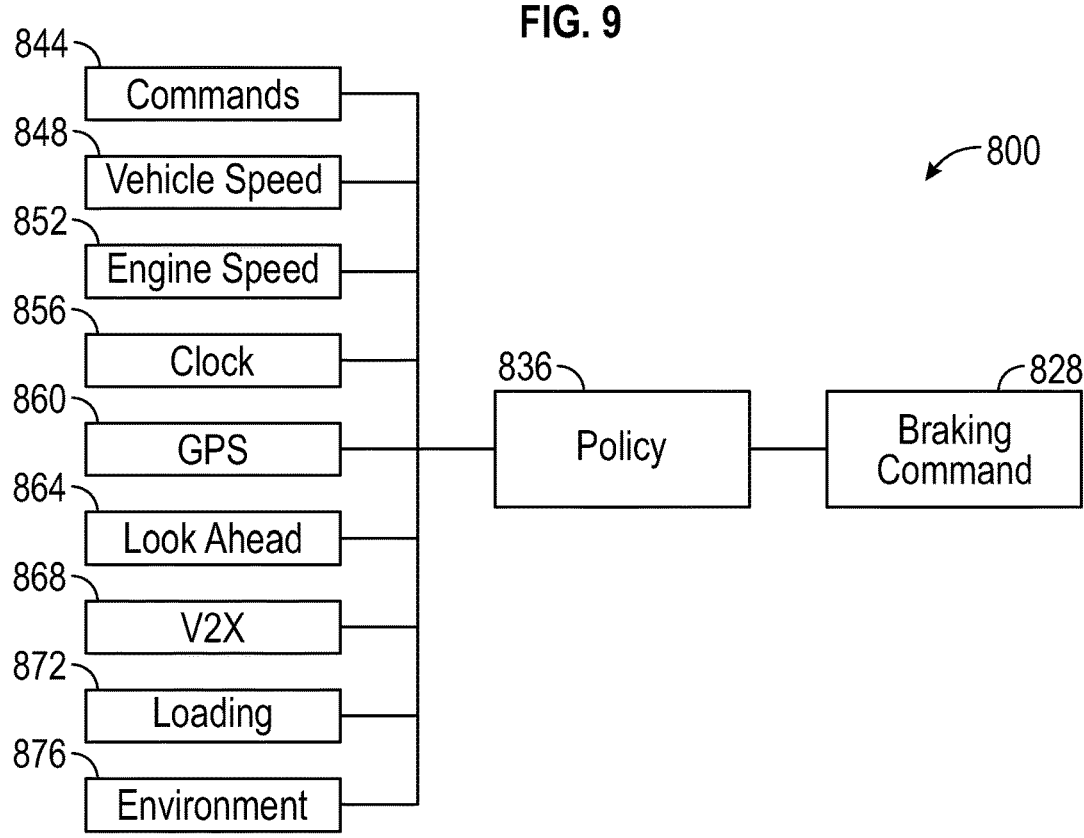
FIG. 10 is a block diagram of a method of operating an electronic braking system, according to an exemplary embodiment.

As shown in FIG. 10, the electronic braking control scheme 800 can be instituted using a policy 836 to generate the braking command 828. As briefly discussed above, in some embodiments the policy 836 includes a PID control scheme that generates the braking command 828 based on commands 844 that are received from the operator via inputs, and/or from vehicle controllers (e.g., ECM, transmission control module, automated driving system, etc.). In some embodiments, the commands 844 include the target vehicle speed and the target engine speed. The braking command 828 is also based on a measured vehicle speed 848 and a measured engine speed 852.

In some embodiments, the policy 836 also receives additional or secondary inputs that can improve the functionality of the electronic braking control scheme 800 in some situations. Some or all of the additional inputs discussed with respect to FIG. 10 may be eliminated, or other additional inputs may be included.

A clock 856 provides time stamps that can be associated with information received from sensors (e.g., physical, virtual, etc.) or generated as final or intermediary control steps. For example, the clock 856 may enable trend analysis of speeds, braking tendencies, torque reserve, etc. The clock 856 can improve the electronic braking control scheme 800 by enabling analysis of information over time within the policy 836.

A location tracker in the form of a GPS device 860 provides location information that can be used to locate the vehicle 10 on a map (e.g., publicly available road maps, mine maps, field maps, etc.). In some embodiments, the location tracker includes lidar, inertial navigation, or other location services to provide location information to the policy 836. The GPS device 860 can improve the electronic braking control scheme 800 by enabling the policy 836 to take location-based information into account during the determination of the braking command 828.

A look ahead system 864 can work in cooperation with the GPS device 860 to anticipate upcoming conditions for the vehicle 10. For example, for on highway applications, the look ahead system 864 may receive traffic or construction information, road grade information (e.g., an extended downslope is upcoming), road condition information, or other information about upcoming roadway conditions. Similarly, the look ahead system 864 can provide anticipatory information about upcoming off-highway roadways. For example, in a mining application, a tunnel may change dynamically over time, and the look ahead system 864 can recognize changes and update look ahead information to improve the operation of the electronic braking control scheme 800. The look ahead system 864 can improve the electronic braking control scheme 800 by utilizing the GPS device 860 to predict upcoming environmental impacts on the policy 836.

A V2X system 868 can provide communication (e.g., via a wireless transmitter/receiver, cellular communication device, sitcom device, etc.) with a network and/or other vehicles in a network of fleet. The V2X system can provide coordination between vehicles in a fleet to improve functionality of the whole fleet. For example, the V2X system 868 may recognize traffic problems, ideal routing, changes in terrain, or other relevant information with a first vehicle 10, and provide that information to either a network or to a second vehicle 10 so that the second vehicle 10 can gain from the experience of the first vehicle 10. The V2X system 868 can improve the electronic braking control scheme 800 by allowing the experience of one vehicle 10 to be shared with another vehicle 10, thereby allowing a better response by the policy 836.

A load determination system 872 determines a gross vehicle weight of the vehicle 10, a load of the vehicle 10, an axle weight of the vehicle 10, a trailer load, a tongue weight, and/or other information related to loading on the vehicle 10. In some embodiments, the loads are calculated using virtual sensors. In some embodiments, the load determination system 872 utilizes stress sensors, engine torque output, command signals, etc. to determine loads. The load determination system 872 can improve the electronic braking control scheme 800 because the ability of the service brakes 150 to slow the vehicle 10 are directly impacted by the loading of the vehicle 10. Knowing the loads allows the policy 836 to account for the different effects of loads and load distribution when determining the braking command 828.

An environmental system 876 can receive weather information, field conditions (e.g., including slope and grade, soil or substrate composition, current moisture content), etc. The information provided by the environmental system 876 can improve the functionality of the electronic braking control scheme 800 by allowing for improved prediction of braking response.

Figure 11:
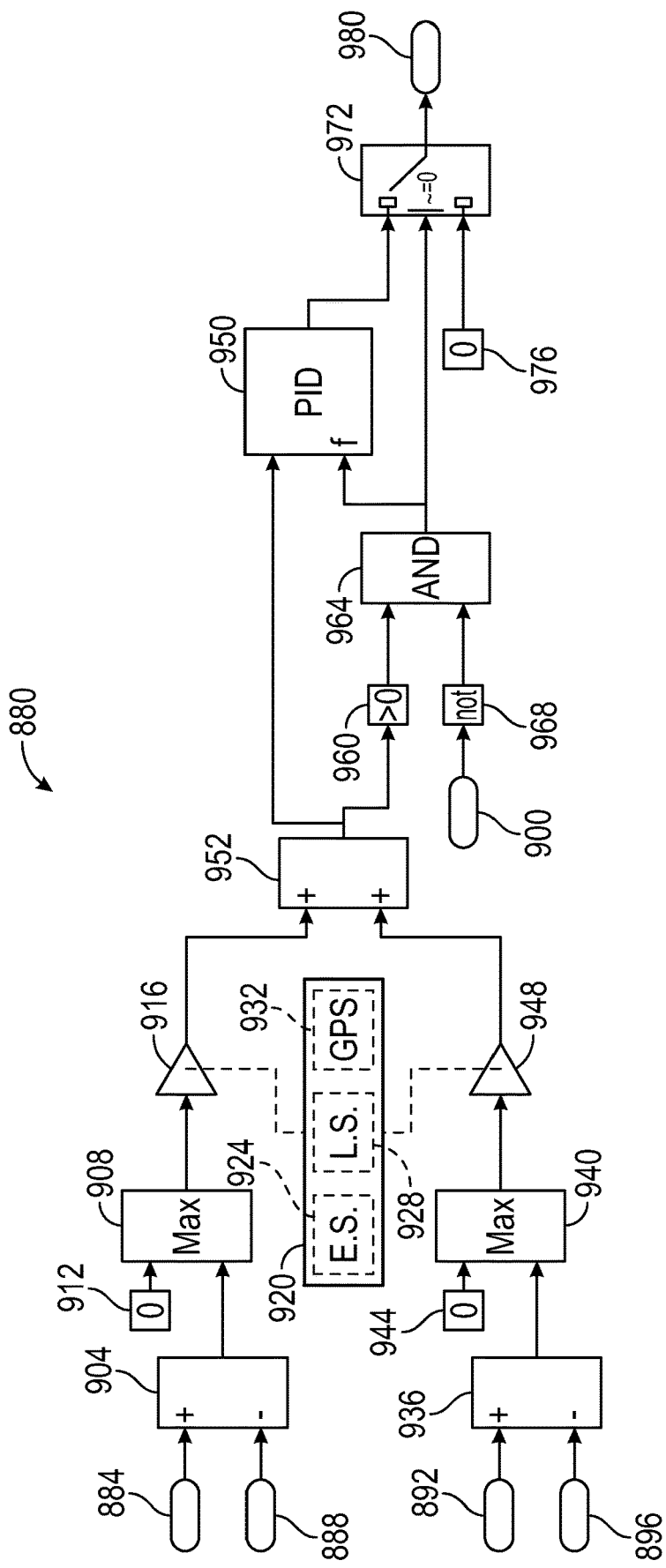
FIG. 11 is a block diagram of a method of operating an electronic braking system, according to an exemplary embodiment.

As shown in FIG. 11, a policy 880 of the electronic braking control scheme 800 receives five primary inputs including a measured engine speed 884, an engine speed command 888 (e.g., a target engine speed), a measured vehicle speed 892, a target vehicle speed 896, and an inhibit command 900 in the form of a step ratio change inhibit signal.

An engine speed subtraction step 904 compares the measured engine speed 884 to the engine speed command 888 and outputs an engine speed comparison value. In some embodiments, the engine speed command 888 is subtracted from the measured engine speed 884. If the measured engine speed 884 is greater than the engine speed command 888, then the engine speed comparison value is positive and indicates an overspeed condition. If the measured engine speed 884 is less than or equal to the engine speed command 888, then the engine speed comparison value is negative or zero and indicates that no overspeed condition exists.

The engine speed comparison value is received by an engine speed maximum step 908 and compared to a zero value 912. The maximum value of the zero value 912 and the engine speed comparison value is selected and the engine speed maximum step 908 outputs an engine overspeed maximum value. For example, if an overspeed condition exists and the engine speed subtraction step 904 outputs a positive engine speed comparison value, then the engine speed comparison value is larger than zero and engine speed comparison value is output as the engine overspeed maximum value. If no overspeed condition exists (e.g., the engine speed command 888 is greater than the measured engine speed 884), then the engine speed comparison value is zero or negative, and the engine speed maximum step 908 outputs the zero value 912 as the engine overspeed maximum value.

The engine overspeed maximum value of the engine speed maximum step 908 is received by an engine speed tuning step 916 and a tuned engine overspeed value is generated based at least in part on secondary inputs 920. In some embodiments, the secondary inputs 920 include a weighted average. In some embodiments, the secondary inputs include environmental sensors 924, load sensors 928, and location systems 932. In some embodiments, other secondary inputs are included, as discussed above. In some embodiments, the engine speed tuning step 916 increases or decreases the engine over speed maximum value in the generation of the tuned engine overspeed value.

A vehicle speed subtraction step 936 compares the measured vehicle speed 892 to the target vehicle speed 896 and outputs a vehicle speed comparison value. In some embodiments, the target vehicle speed 896 is subtracted from the measured vehicle speed 892. If the measured vehicle speed 892 is greater than the target vehicle speed 896, then the vehicle speed comparison value is positive and indicates an overspeed condition. If the measured vehicle speed 892 is less than or equal to the target vehicle speed 896, then the vehicle speed comparison value is negative or zero and indicates that no overspeed condition exists.

The vehicle speed comparison value is received by a vehicle speed maximum step 940 and compared to a zero value 944. The maximum value of the zero value 944 and the vehicle speed comparison value is selected and the vehicle speed maximum step 940 outputs a vehicle overspeed maximum value. For example, if an overspeed condition exists and the vehicle speed subtraction step 936 outputs a positive vehicle speed comparison value, then the vehicle speed comparison value is larger than the zero value 944 and vehicle speed comparison value is output as the vehicle overspeed maximum value. If no overspeed condition exists (e.g., the target vehicle speed 896 is greater than or equal to the measured vehicle speed 892), then the vehicle speed comparison value is zero or negative, and the vehicle speed maximum step 940 outputs the zero value 944 as the vehicle overspeed maximum value.

The vehicle overspeed maximum value of the vehicle speed maximum step 940 is received by a vehicle speed tuning step 948 and a tuned vehicle overspeed value is generated based at least in part on the secondary inputs 920. In some embodiments, the vehicle speed tuning step 948 increases or decreases the vehicle overspeed maximum value in the generation of the tuned vehicle overspeed value.

A summation step 952 receives and sums the tuned engine overspeed value and the tuned vehicle overspeed value and generates a total overspeed value that is indicative of the combined overspeed conditions of engine overspeed and vehicle overspeed. For example, the vehicle speed may be experiencing an overspeed condition, while the engine is not, and vice versa. Additionally, both the engine speed and the vehicle speed may be experiencing overspeed conditions, or neither the engine speed nor the vehicle speed may be experiencing overspeed conditions. The summation step 952 accounts for the combined effects of any overspeed conditions in a single output, the total overspeed value.

The total overspeed value is received by a controller in the form of a PID controller 950. In some embodiments, the controller is any processing circuit structured to enact the policy 880 and may include PID functionality, machine learning architecture, model predictive control, or another control scheme for enactment of the policy 880. The PID controller 950 receives the total overspeed value as an input and generates a brake command value.

The total overspeed value is also received by a value check step 960 that determines if the total overspeed value is greater than zero. In other words, the value check step 960 determines if any overspeed condition exists. If the total overspeed value is greater than zero, then the value check step 960 outputs a true value (e.g., value of 1) that is received by an AND comparison step 964.

The inhibit command 900 is received by a NOT step 968 which inverses the value of the inhibit command 900. For example, if the inhibit command is active or it is true (e.g., value of 1), then the NOT step 968 will output a false value (e.g., a value of 0). Conversely, if the inhibit command is not active or it is false (e.g., a value of 0), then the NOT step 968 will output a true value (e.g., a value of 1).

The AND comparison step 964 receives the output value from the value check step 960 and the NOT step 968 as input values. If both input values are true, then the AND comparison step 964 provides a true value in the form of an inhibit OFF command to the PID controller 950 and a switch 972. If either of the input values are false (e.g., the total overspeed value is zero, the inhibit command 900 is active), then the AND comparison step 964 provides a false value in the form of an inhibit ON command to the PID controller 950 and the switch 972.

The switch 972 includes three inputs and a single output. A first input is a logical switch that receives the output of the AND comparison step 964. If the AND comparison step 964 outputs a true condition, then the brake command value generated by the PID controller 950 is provided to the output as a braking command 980. If the AND comparison step 964 outputs a false condition, then a zero value 976 is provided to the output as the braking command 980. In one example, where the inhibit command 900 is active, the braking command 980 is zero and therefore no application of the service brakes 150 is enacted (i.e., the service brakes are applied zero percent) to avoid a skidding condition. In some embodiments, the logical flow of the inhibit command determination is different. For example, the inhibit command 900 may be used directly as an input in a machine learning policy, or the switch 972 may receive the inhibit command 900 directly.

The braking command 980 includes a proportional value in the form of a percentage, a calibrated voltage or current output, or an information packet that is receivable by the braking subsystem 110 to enact the braking command 980. The braking command 980 results in the slowing of the measured engine speed 884 and/or the measured vehicle speed 892 to reduce the overspeed condition.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

The invention claimed is:

1. A control system for a vehicle, the control system comprising:
one or more processing circuits comprising one or more memory devices coupled to one or more processors, the one or more memory devices configured to store instructions thereon that, when executed by the one or more processors, cause the one or more processors to:
acquire speed data regarding current speeds of tractive elements of the vehicle from tractive element speed sensors of the vehicle;
determine speed references for the tractive elements to perform autonomous driving operations, wherein the speed references indicate speeds at which each of the tractive elements should rotate to accommodate the autonomous driving operations; and
control at least one of a driveline or a brake system of the vehicle to selectively alter the current speeds of the tractive elements of the vehicle based on the current speeds and the speed references to accommodate the autonomous driving operations.

2. The control system of claim 1, wherein the one or more memory devices are further configured to store instructions thereon that, when executed by the one or more processors, cause the one or more processors to:
acquire environment data regarding an environment proximate the vehicle; and
determine the autonomous driving operations for the vehicle based on the environment data.

3. The control system of claim 2, wherein the one or more memory devices are further configured to store instructions thereon that, when executed by the one or more processors, cause the one or more processors to:
acquire vehicle information regarding vehicle dynamics and functional capabilities of the vehicle; and
determine the speed references for the tractive elements based on the autonomous driving operations and the vehicle information.

4. The control system of claim 1, wherein the one or more processing circuits includes a first processing circuit configured to control the brake system and a second processing circuit configured to control the driveline.

5. The control system of claim 4, wherein, in response to the speed references being greater than the current speeds:
(i) the first processing circuit is configured to control the brake system to relieve or remove brake power, if being applied; and
(ii) the second processing circuit is configured to control the driveline to provide driveline power.

6. The control system of claim 4, wherein, in response to the speed references being less than the current speeds, at least one of:
(i) the first processing circuit is configured to control the brake system to provide brake power;
(ii) the second processing circuit is configured to control the driveline to provide driveline brake power; or
(iii) the second processing circuit is configured to command the first processing circuit to disregard any differences between the current speeds and the speed references and refrain from engaging the brake system.

7. The control system of claim 6, wherein, in response to the speed references being less than the current speeds, the second processing circuit is configured to command the first processing circuit to disregard any differences between the current speeds and the speed references and refrain from engaging the brake system in response to at least one of (i) a first determination that the driveline brake power is sufficient to slow the vehicle or (ii) a second determination that inertial and ground effects on the vehicle are sufficient to slow the vehicle.

8. The control system of claim 6, wherein, in response to the speed references being less than the current speeds, the second processing circuit is configured to control the driveline to provide the driveline brake power.

9. The control system of claim 6, wherein, in response to the speed references being less than the current speeds, the first processing circuit is configured to control the brake system to provide the brake power.

10. The control system of claim 9, wherein the first processing circuit is configured to relieve the brake power of a respective brake of the brake system in response to a current speed of a respective tractive element associated with the respective brake decreasing at a rate greater than a threshold rate.

11. The control system of claim 6, wherein, in response to the speed references being less than the current speeds, (i) the first processing circuit is configured to control the brake system to provide the brake power and (ii) the second processing circuit is configured to control the driveline to provide the driveline brake power, simultaneously.

12. The control system of claim 1, wherein the one or more memory devices are further configured to store instructions thereon that, when executed by the one or more processors, cause the one or more processors to, in response to an imbalance in the speed references between a first side and an opposing side of the vehicle, control at least one of the brake system or the driveline such that the tractive elements on the first side of the vehicle rotate at a different speed than the tractive elements on the opposing side of the vehicle to provide or assist in steering of the vehicle.

13. The control system of claim 1, wherein the one or more memory devices are further configured to store instructions thereon that, when executed by the one or more processors, cause the one or more processors to engage a respective brake of the brake system in response to a current speed of one of the tractive elements increasing at a rate greater than a threshold rate and, thereby, indicating a loss of traction event.

14. The control system of claim 13, wherein the respective brake is associated with the one of the tractive elements experiencing the loss of traction event.

15. The control system of claim 13, wherein the respective brake is associated with a tractive element positioned opposite the one of the tractive elements experiencing the loss of traction event.

16. A control system for a vehicle, the control system comprising:
one or more processing circuits configured to:
acquire speed data regarding current speeds of tractive elements of the vehicle;
determine speed references for the tractive elements to perform autonomous driving operations, wherein the speed references indicate speeds at which each of the tractive elements should rotate to accommodate the autonomous driving operations;
control at least one of a driveline or a brake system of the vehicle to selectively alter the current speeds of the tractive elements of the vehicle based on the current speeds and the speed references to accommodate the autonomous driving operations;
detect a loss of traction event for a respective tractive element of the tractive elements in response to a current speed of the respective tractive element increasing at a rate greater than a threshold rate; and
in response to the loss of traction event, engage a respective brake of the brake system associated with a tractive element positioned opposite the respective tractive element experiencing the loss of traction event.

17. The control system of claim 16, wherein engaging the respective brake of the brake system associated with the tractive element positioned opposite the respective tractive element experiencing the loss of traction event facilitates maintaining adherence to a travel path by preventing the vehicle from veering off the travel path due to a speed imbalance that would otherwise occur from braking the respective tractive element experiencing the loss of traction event.

18. The control system of claim 16, wherein the one or more processing circuits are configured to:
acquire environment data regarding an environment proximate the vehicle; and
determine the autonomous driving operations for the vehicle based on the environment data.

19. The control system of claim 18, wherein the one or more processing circuits are configured to:
acquire vehicle information regarding vehicle dynamics and functional capabilities of the vehicle; and
determine the speed references for the tractive elements based on the autonomous driving operations and the vehicle information.

20. A control system for a vehicle, the control system comprising:
one or more processing circuits configured to:
monitor (i) a speed of a first tractive element positioned on a first side of the vehicle and (ii) a speed of a second tractive element positioned on an opposing side of the vehicle;
detect a loss of traction event for the first tractive element in response to the speed of the first tractive element increasing at a rate greater than a threshold rate; and
engage a brake associated with the second tractive element to slow the opposing side of the vehicle similar to the first side of the vehicle as a result of the loss of traction event.

* * * * *